United States Patent [19]
Koizumi

[11] Patent Number: 5,969,878
[45] Date of Patent: Oct. 19, 1999

[54] ZOOM LENS SYSTEM

[75] Inventor: Hiroshi Koizumi, Kawasaki, Japan

[73] Assignee: Ricoh Company, Ltd., Tokyo, Japan

[21] Appl. No.: 08/922,181

[22] Filed: Sep. 2, 1997

[30] Foreign Application Priority Data

Sep. 9, 1996 [JP] Japan .................................. 8-237672
Jan. 28, 1997 [JP] Japan .................................. 9-014308

[51] Int. Cl.⁶ .......................... G02B 15/14; G02B 13/04; G02B 9/12
[52] U.S. Cl. .......................... 359/682; 359/681; 359/689; 359/750; 359/784
[58] Field of Search .................... 359/681, 682, 359/689, 784, 750

[56] References Cited

U.S. PATENT DOCUMENTS

| | | | |
|---|---|---|---|
| 4,170,402 | 10/1979 | Nakagawa | 359/681 |
| 4,465,343 | 8/1984 | Horimoto | 359/681 |
| 4,735,493 | 4/1988 | Tachihara | 359/681 |
| 4,828,372 | 5/1989 | Betensky et al. | 359/684 |
| 5,007,719 | 4/1991 | Hasegawa | 359/683 |
| 5,157,550 | 10/1992 | Tsuchida et al. | 359/689 |
| 5,262,897 | 11/1993 | Kawamura | 359/689 |
| 5,270,863 | 12/1993 | Uzawa | 359/682 |
| 5,442,484 | 8/1995 | Shikawa | 359/682 |
| 5,568,323 | 10/1996 | Sensui | 359/689 |
| 5,583,700 | 12/1996 | Usui et al. | 359/688 |
| 5,644,434 | 7/1997 | Hagimori | 359/689 |
| 5,751,497 | 5/1998 | Usui et al. | 359/683 |

FOREIGN PATENT DOCUMENTS

| | | |
|---|---|---|
| 3-20735 | 8/1986 | Japan . |
| 6-94996 | 4/1994 | Japan . |

*Primary Examiner*—Georgia Epps
*Assistant Examiner*—Evelyn A. Lester
*Attorney, Agent, or Firm*—Graham & James LLP

[57] ABSTRACT

A zoom lens system for use in a camera having a color filter and a CCD achieves a magnification ratio of about 2.9 or greater and a back focus of about 9.2 or greater. The zoom lens system includes in order from an object side of the lens system, a first lens group having a negative refracting power, a second lens group spaced from the first lens group and having a positive refracting power and a third lens group spaced from the second lens group and having a positive refracting power. One or both of the fifth and an eighth lens surface has an aspherical surface, the fifth and eighth lens surfaces being counted from the object side. The second lens group includes five lenses with an extra lens being located at a far end of the second lens group relative to the object side. Each of the first, second and third lens groups is movable from a first position when the lens system is in a wide position to a second position when the lens system is in a tele position.

50 Claims, 22 Drawing Sheets

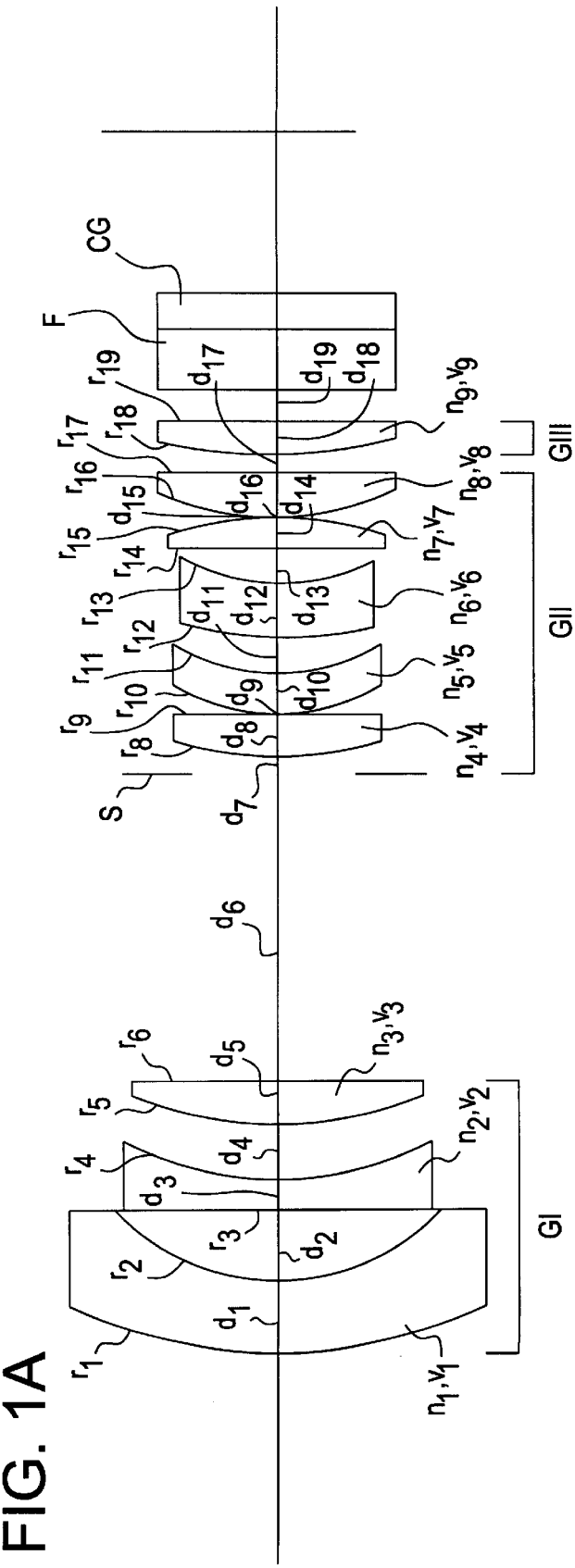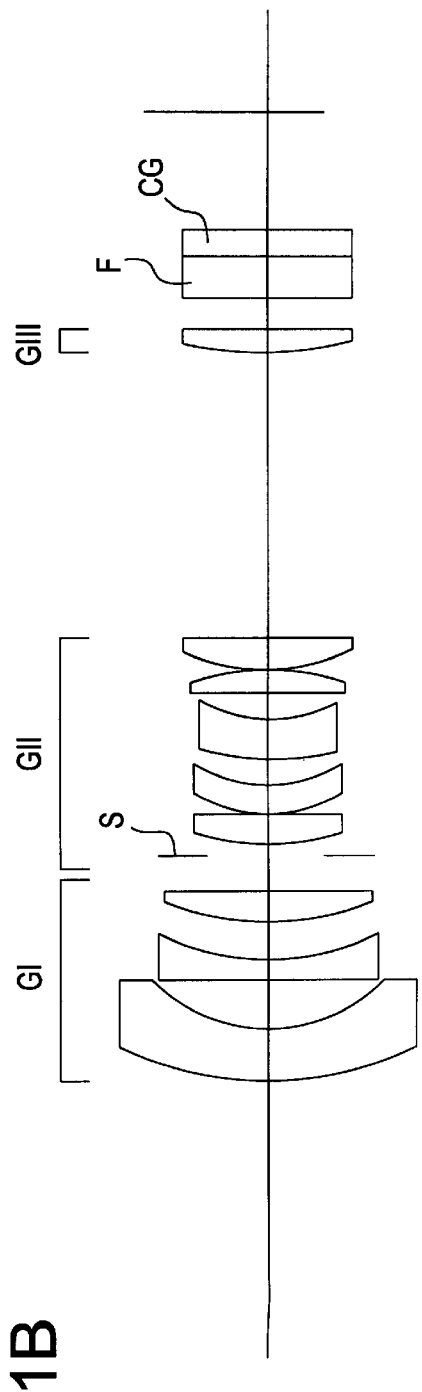
FIG. 1A
FIG. 1B

F/No.= 3.3
-0.100 0 0.100
SA,SC w= 20.3
-0.100 0 0.100
Ast w= 20.3
-5.00 0 5.00
Dist F/No. 4.1
-0.100 0 0.100
SA,SC w= 12.0
-0.100 0 0.100
Ast w= 12.0
-5.00 0 5.00
Dist F/No.= 28

-0.100 0 0.100
SA,SC w= 32.9

-0.100 0 0.100
Ast w= 32.9

-5.00 0 5.00
Dist

F/No.= 3.3

-0.100 0 0.100
SA,SC w= 20.3

-0.100 0 0.100
Ast w= 20.3

-5.00 0 5.00
Dist

F/No.= 4.2 w= 12.0 w= 12.0

F/No.= 2.8 w= 33.0 w= 33.0

F/No.=3.3

-0.100 0 0.100
SA, SC w=20.3

-0.100 0 0.100
Ast w=20.3

-5.00 0 5.00
Dist

F/No.=4.1

-0.100 0 0.100
SA, SC w=12.0

-0.100 0 0.100
Ast w=12.0

-5.00 0 5.00
Dist

FIG. 15A    FIG. 15B    FIG. 15C
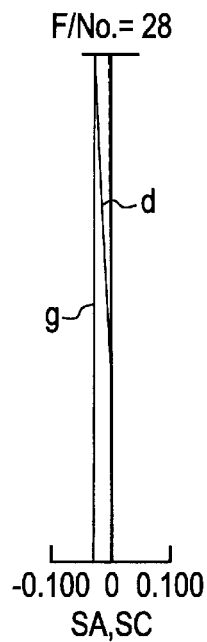 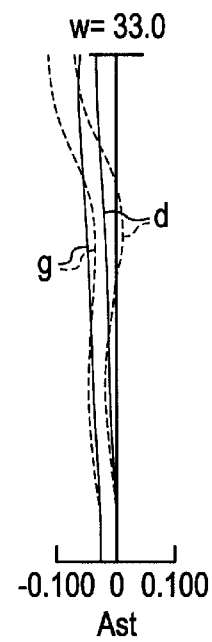 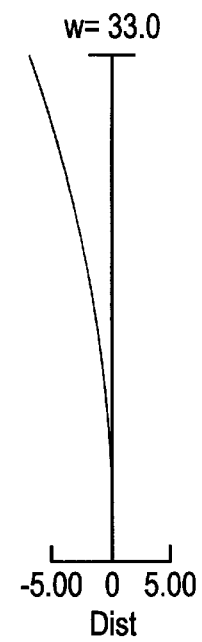
FIG. 16A    FIG. 16B    FIG. 16C
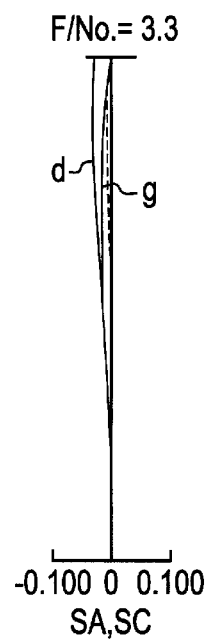 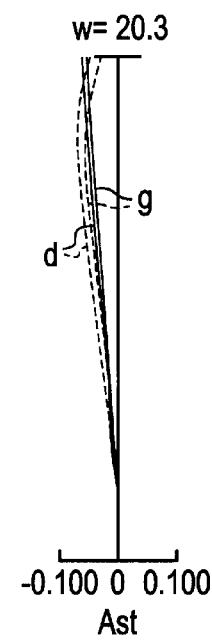 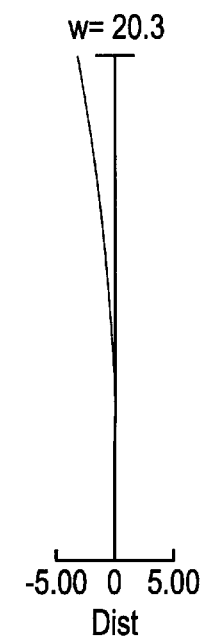

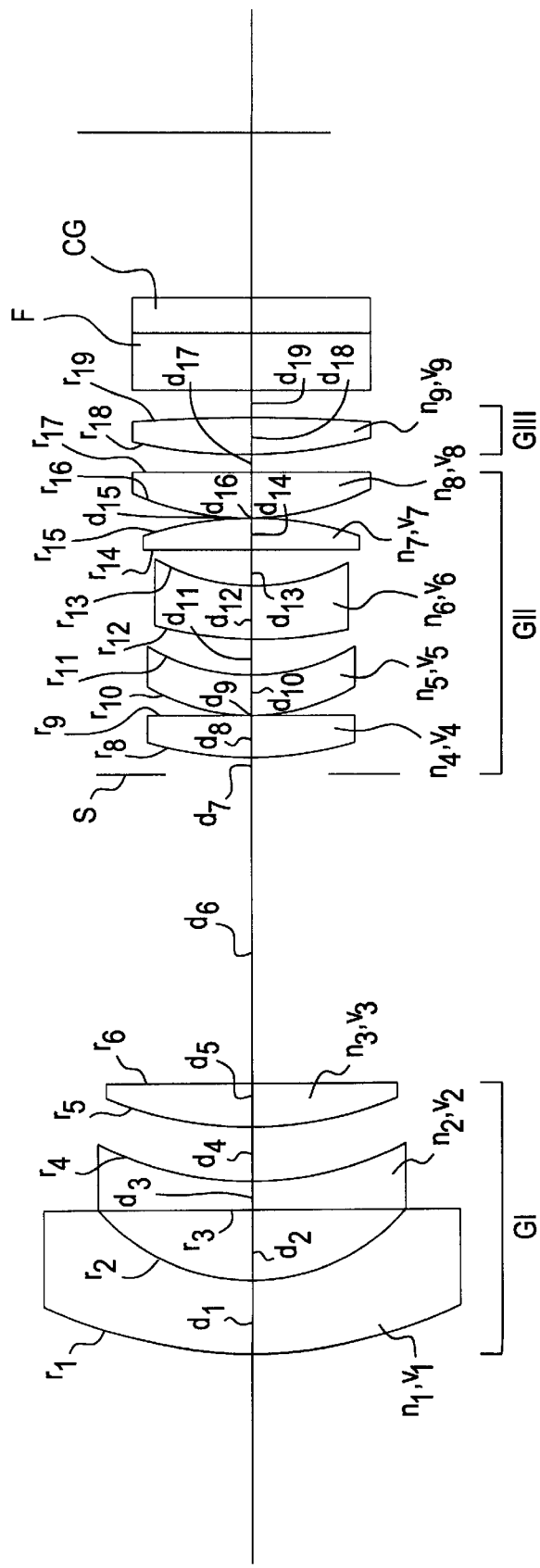
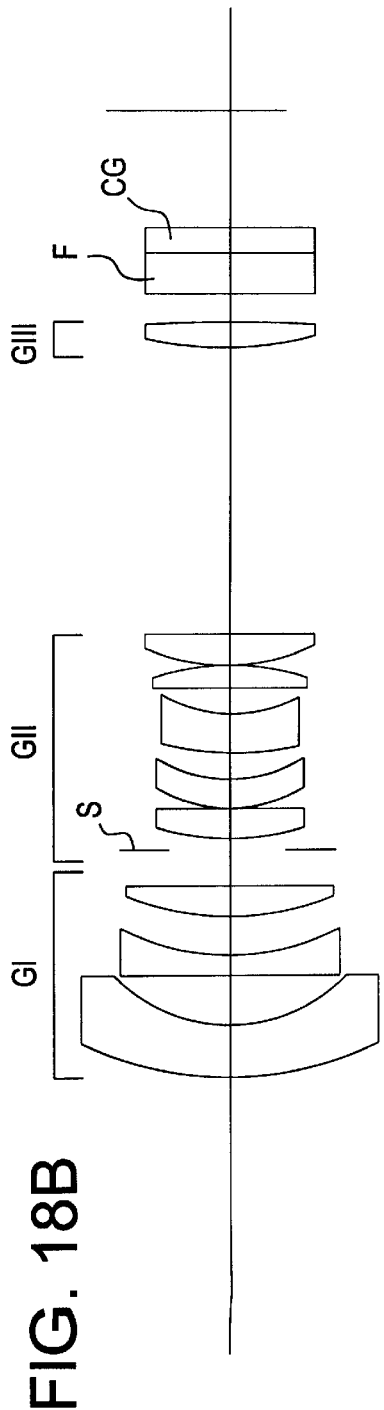
FIG. 18A
FIG. 18B

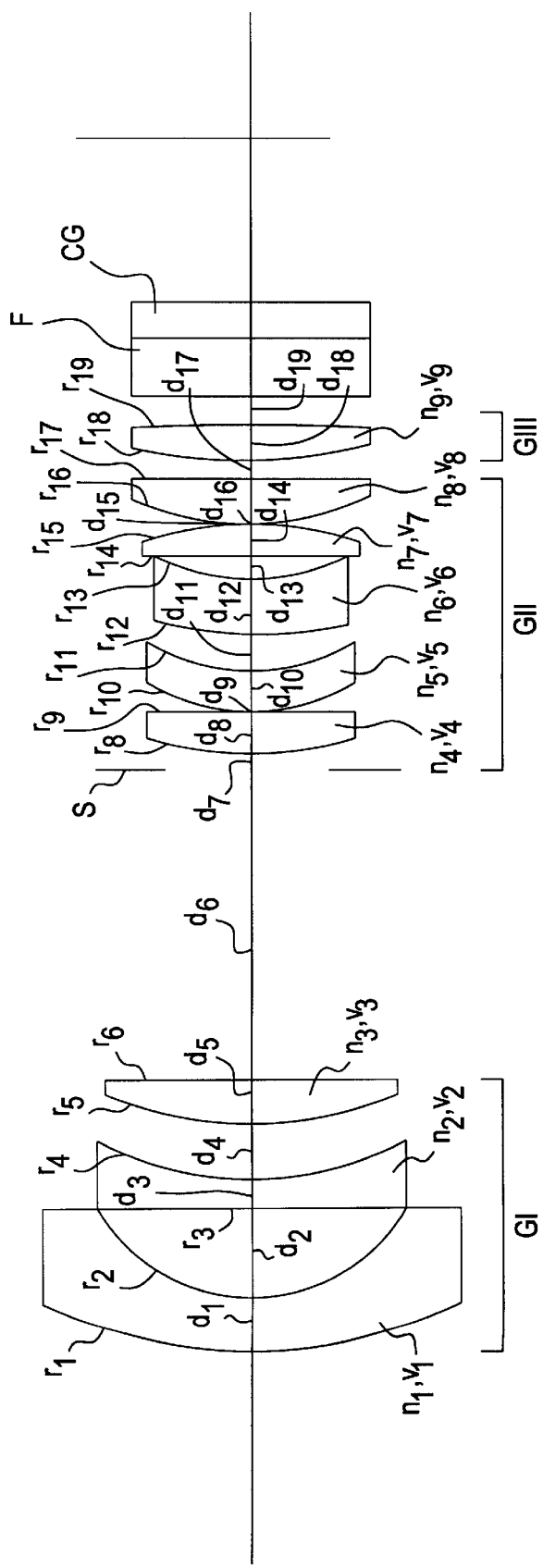
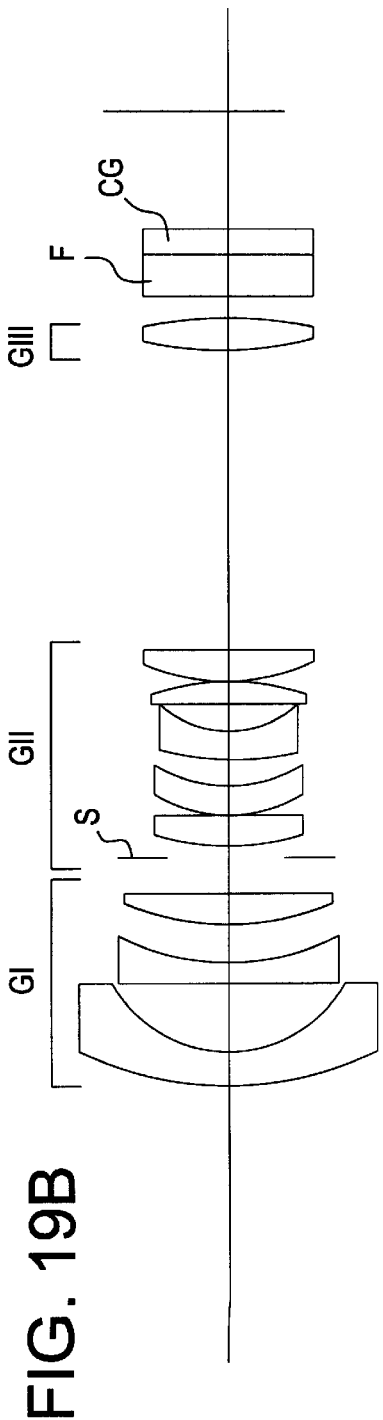
FIG. 19A
FIG. 19B

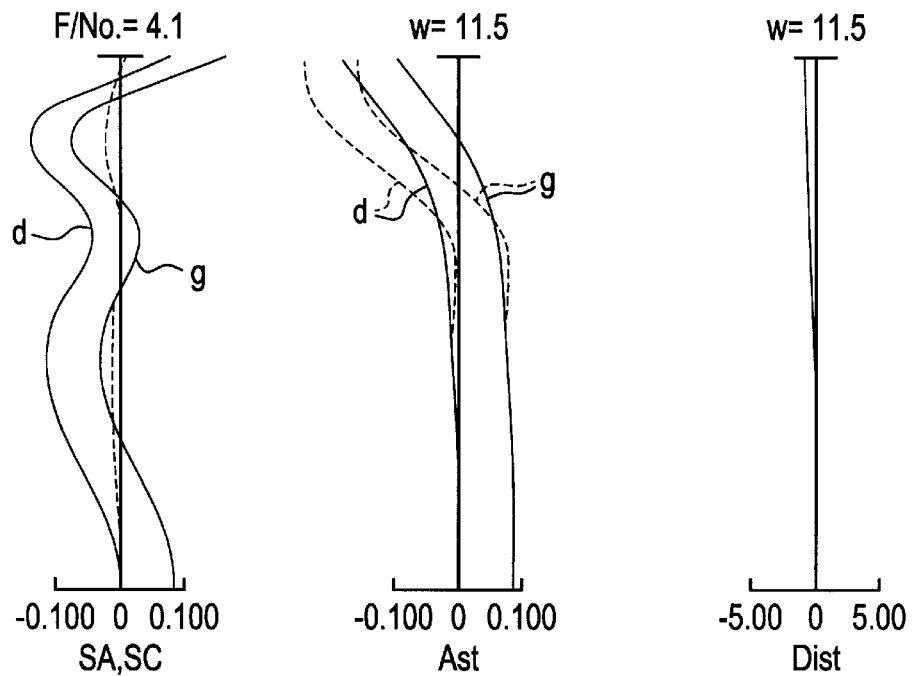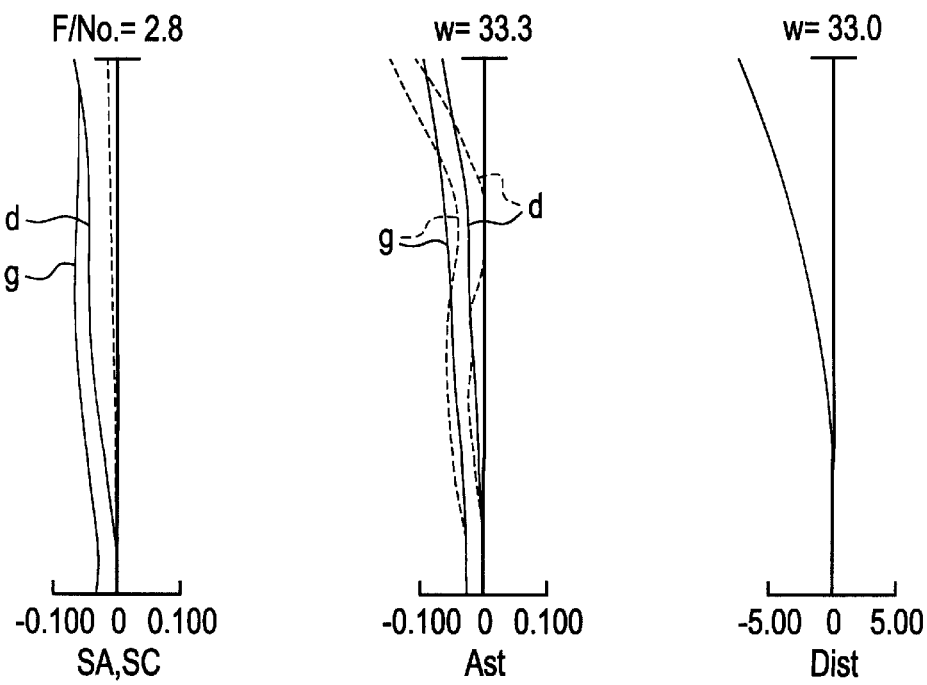

F/No.= 3.2

-0.100 0 0.100
SA,SC w= 20.3

-0.100 0 0.100
Ast w= 20.3

-5.00 0 5.00
Dist

F/No.= 4.0

-0.100 0 0.100
SA,SC w= 11.8

-0.100 0 0.100
Ast w= 11.8

-5.00 0 5.00
Dist

F/No.= 2.8

-0.100  0  0.100
SA,SC w= 33.2

-0.100  0  0.100
Ast w= 33.2

-5.00  0  5.00
Dist

F/No.= 3.2

-0.100  0  0.100
SA,SC w= 20.2

-0.100  0  0.100
Ast w= 20.2

-5.00  0  5.00
Dist

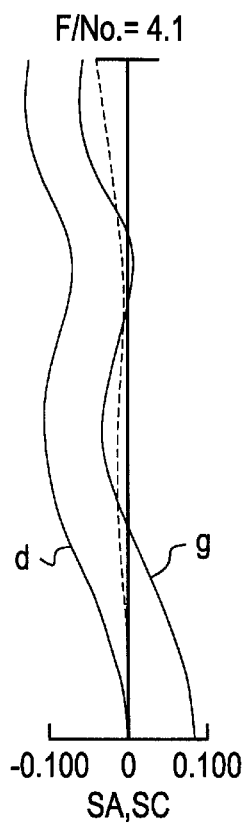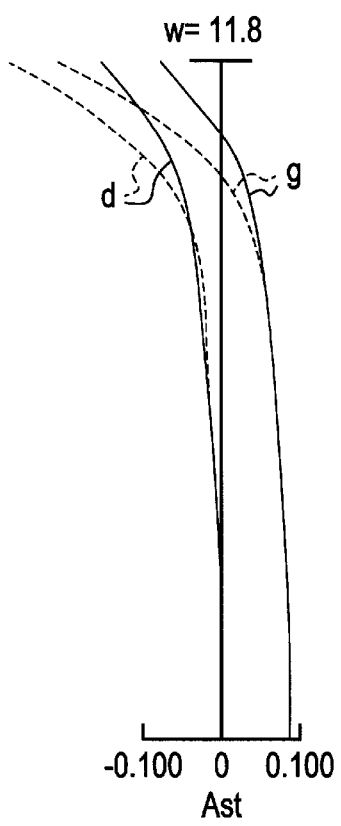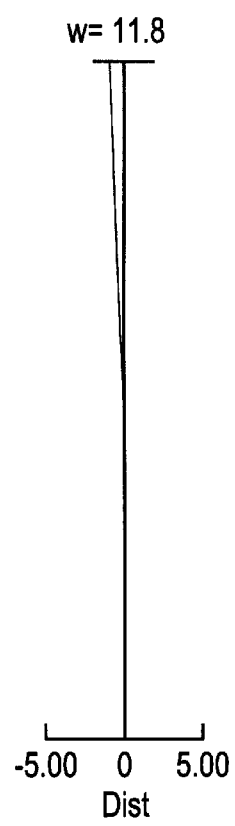

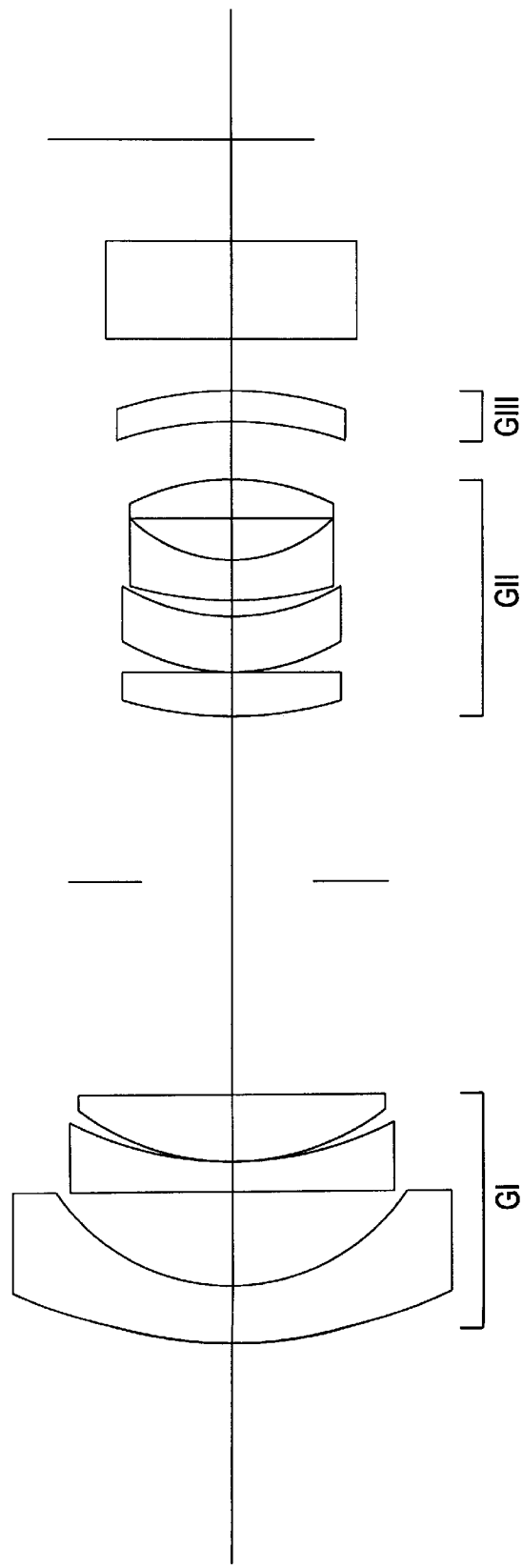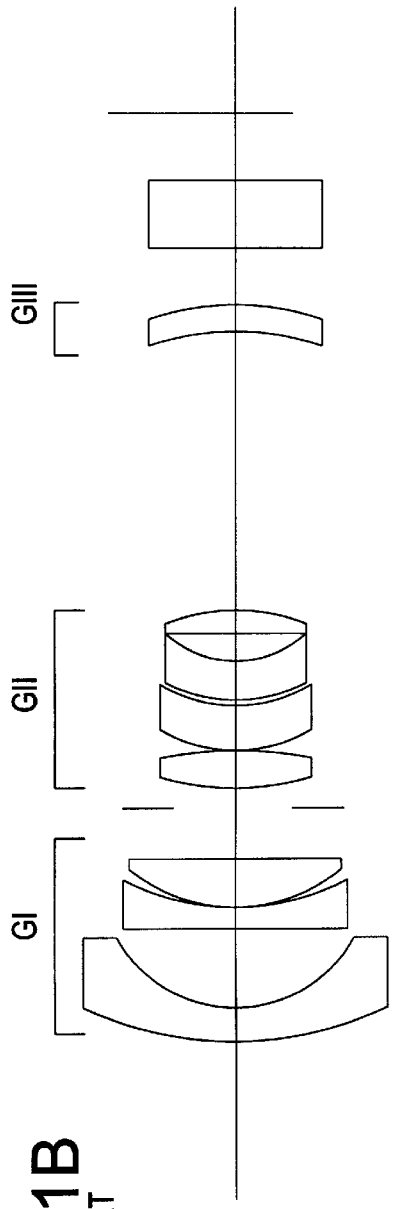
FIG. 31A PRIOR ART
FIG. 31B PRIOR ART

ZOOM LENS SYSTEM

BACKGROUND OF THE INVENTION

1. Field of the Invention

The present invention relates to an improved zoom lens system for use as a zoom lens in a video camera recorder, a digital still video camera or the like. More particularly, the present invention relates to a compact zoom lens system for varying a focal length and providing improved magnification and back focus.

2. Description of Related Art

In conventional zoom lens systems, most wide angle zoom lenses use a "two-lens group" system which are typically provided in single lens reflex film cameras which do not use a color filter or Charge Coupled Device (CCD) as is used in a video camera recorder or a digital still video camera.

A typical lens system for use in a conventional film camera and not adapted for use in a camera having a color filter or CCD is described in Japanese Koukoku Patent No. 3-20735. The zoom lens system of this prior art reference differs from the conventional two lens-group system by inserting a lens unit having positive refractive power at a space located between a first lens group having a negative refractive power and a second lens group having a positive refractive power, described from the object side, so as to provide three "lens groups." The lens system of this reference also provides desired spacing between the first lens group and the lens unit and between the second lens group and the lens unit to provide for more effective compensation of distortion, to miniaturize the lens system and to decrease a minimum object distance during focus adjustment. This zoom lens system performs zooming by displacing the first and second lens groups and the one lens unit independently while maintaining the position of the image surface constant.

With such a device, it is not required or desirable to have an image surface located or moved far from an exit pupil but instead, the image surface is preferably located close to the exit pupil. Further, the lens unit or third lens group is located between the first and second lens groups.

As is mentioned above, the zoom lens system of JP 3-20735 is not adapted for use with a color filter or CCD as is required in a video camera recorder or a digital still video camera. Designing a zoom lens system for use with a color filter and CCD presents special problems. In a typical device, a lens is spaced from a color filter, such as an infrared cut filter which may include low-pass filters disposed on either side of the infrared cut filter, and the color filter is spaced away from a CCD. The lens, the color filter and the CCD are aligned along an axis.

As is well known, the color filter includes a plurality of pixels which are aligned with a plurality of pixels contained in the CCD to ensure that an image passing through the lens, the color filter and the CCD is correctly formed without distortion and other defects. When any portion of a light flux passing through the lens to the color filter and then to the CCD is inclined relative to the optical axis, an image cannot be formed correctly and the image is distorted resulting in a poor telecentric character. Thus, when a light flux is inclined relative to the optical axis, a telecentric character is poor.

It was discovered that a poor telecentric character can be overcome and a good telecentric character can be provided if an exit pupil is located sufficiently far from an image surface. Thus, when a zoom lens system is arranged such that an exit pupil is located far from an image surface, the telecentric character is good.

Japanese Laid Open Patent Number 6-94996 teaches such a conventional zoom lens system for use with a camera having a color filter and CCD which provides a good telecentric character by arranging an exit pupil far from an image surface. The structure of the device described in JP 6-94996 is shown in FIG. 31 of the present application. As seen in FIG. 31, the zoom lens system of JP 6-94996, includes successively from an object side, a first lens group I having a negative refracting power, a second lens group II having a positive refracting power and a third lens group III having a positive refracting power. In this system, the first lens group I moves with the second lens group II as shown in FIG. 31 to correct the movement of the focus position according to the variable power. The third lens group III remains stationary during power variation. An aperture diaphragm is fixed between the first lens group I and the second lens group II.

Although the zoom lens system shown in FIG. 31 solves the problems described above and provides an acceptable telecentric character, the zoom lens system of FIG. 31 is only capable of achieving a relatively small magnification and back focus. For example, it has been determined that the lens system shown in FIG. 31 can only achieve a magnification ratio of 1.9 and a back focus of 6.1. Thus, the zoom lens system of FIG. 31 has serious disadvantages for use in a video camera recorder, a digital still video camera or the like because of the severely limited magnification ratio and back focus.

SUMMARY OF THE INVENTION

The preferred embodiments of the present invention overcome the problems with the conventional zoom lens systems by providing a zoom lens system for use with a video camera recorder, a digital still video camera and the like, the zoom lens system having a good telecentric character, a significantly increased magnification ratio and a significantly increased back focus, while also having a compact lens body tube size.

In a first preferred embodiment of the present invention, a zoom lens system for use in a camera having a color filter and a CCD includes in order from an object side of the lens system, a first lens group having a negative refracting power, a second lens group spaced from the first lens group and having a positive refracting power and a third lens group spaced from the second lens group and having a positive refracting power, wherein at least one of a fifth and an eighth lens surface has an aspherical surface, the fifth and eighth lens surfaces being counted from the object side.

The aspherical surface of the fifth and/or eighth lens surface is preferably designed for use as a convex surface. It is also preferred that the aspherical surface is located close to the aperture area to improve correction of distortion. This location of the aspherical surface is preferred because in the aperture area, light flux is gathering and can be corrected more easily and accurately at that location to prevent distortion.

In a second preferred embodiment of the present invention, both of the fifth and eighth lens surfaces have an aspherical convex surface.

With the novel structure and arrangement of the first and second preferred embodiments of the present invention, it is possible to provide a zoom lens system for use with a camera having a color filter and CCD, the zoom lens system having a magnification ratio of about 2.9 or greater. This significant increase in magnification ratio is achieved by the provision of an aspherical surface at either or both of the fifth and eighth lens surfaces. More specifically, the provision of the aspherical surface at the fifth lens surface achieves a higher magnification ratio and correction of the distortion and aberrations when the lens system is in the wide position. The provision of an aspherical surface at the eighth lens surface achieves a higher magnification ratio and correction of distortions and aberrations when the lens system is in the tele position.

In a third preferred embodiment, a zoom lens system for use in a camera having a color filter and a CCD includes in order from an object side of the lens system, a first lens group having a negative refracting power, a second lens group spaced from the first lens group and having a positive refracting power and a third lens group spaced from the second lens group and having a positive refracting power, wherein the second lens group includes five lenses. In this third preferred embodiment, an additional lens in the form of a fifth lens is added to the second lens group such that the second lens group has one more lens than the second lens group of the conventional zoom lens system of FIG. 31.

In the third preferred embodiment of the present invention, it is preferred that the additional lens be added to a far end of the second lens group, relative to the object side, so as to locate an exit pupil far from an image surface and to increase the back focus length. As a result of the addition of the fifth lens and location of the lens at the end of the second lens group, the magnification ratio and back focus are substantially increased and the distance between the image surface and the exit pupil is also substantially increased.

As a result of the novel structure and arrangement of the third preferred embodiment, it is possible to achieve a zoom lens system for use with a camera having a color filter and CCD, the zoom lens having a back focus of at least about 9.2 or greater.

According to a fourth preferred embodiment, a zoom lens system for use in a camera having a color filter and a CCD includes in order from an object side of the lens system, a first lens group having a negative refracting power, a second lens group spaced from the first lens group and having a positive refracting power and a third lens group spaced from the second lens group and having a positive refracting power, wherein each of the first, second and third lens groups are movable from a first position when the lens system is in a wide position to a second position when the lens system is in a tele position.

In contrast to the prior art shown in FIG. 31, the zoom lens system according to this fourth preferred embodiment arranges the third lens group to be movable toward an object side when the lens system is in the wide position and toward an image surface when the lens system is in the tele position. As a result of this movement, the aperture moves with the second lens group whereas the aperture in the prior art system of FIG. 31 remains fixed. The movement of the third lens group minimizes the total length between a first surface of the first lens group and the image surface. Also, the movement of the third lens group significantly increases the length of the back focus while maintaining the image accuracy and avoiding distortion. With the fourth preferred embodiment, it also possible to achieve a back focus of about 9.2 or greater.

It is important to note that each of the novel structural features and novel arrangement of structural elements of the preferred embodiments described above can be combined together as desired.

For example, a fifth preferred embodiment provides a zoom lens system for use in a camera having a color filter and a CCD, the zoom lens system including in order from an object side of the lens system, a first lens group having a negative refracting power, a second lens group spaced from the first lens group and having a positive refracting power and a third lens group spaced from the second lens group and having a positive refracting power, wherein each of a fifth and an eighth lens surface has an aspherical surface, the fifth and eighth lens surfaces being counted from the object side, the second lens group including five lenses, each of the first, second and third lens groups being movable from a first position when the lens system is in a wide position to a second position when the lens system is in a tele position. The zoom lens system according to the fifth preferred embodiment achieves a magnification ratio of about 2.9 or greater and a back focus of about 9.2 or greater.

Other advantages of the preferred embodiments of the present invention will become apparent from the following description of the preferred embodiments of the present invention which are shown in the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 (*a*) is a section view for explaining an arrangement of a zoom lens system at a wide position in accordance with a first preferred embodiment of the present invention;

FIG. 1 (*b*) is a section view for explaining an arrangement of a zoom lens system at a tele position in accordance with the first preferred embodiment of the present invention;

FIG. 2 (*b*) is a section view for explaining an arrangement of a zoom lens system at a tele position in accordance with the second preferred embodiment of the present invention;

FIG. 3 (*b*) is a section view for explaining an arrangement of a zoom lens system at a tele position in accordance with the third preferred embodiment of the present invention;

FIG. 4 (*b*) is a section view for explaining an arrangement of a zoom lens system at a tele position in accordance with the fourth preferred embodiment of the present invention;

FIG. 15 is an aberrational diagram of a zoom lens system showing an aspherical aberration, a sine condition, an astigmatism, and a distortion aberration at a wide position in accordance with the fourth preferred embodiment of the present invention;

FIG. 16 is an aberrational diagram of a zoom lens system showing an aspherical aberration, a sine condition, an astigmatism, and a distortion aberration at a middle position in accordance with the fourth preferred embodiment of the present invention;

FIG. 18 (a) is a section view for explaining an arrangement of a zoom lens system at a wide position in accordance with a fifth preferred embodiment of the present invention;

FIG. 18 (b) is a section view for explaining an arrangement of a zoom lens system at a tele position in accordance with the fifth preferred embodiment of the present invention;

FIG. 19 (a) is a section view for explaining an arrangement of a zoom lens system at a wide position in accordance with a sixth preferred embodiment of the present invention;

FIG. 19 (b) is a section view for explaining an arrangement of a zoom lens system at a tele position in accordance with the sixth preferred embodiment of the present invention;

FIG. 20 (b) is a section view for explaining an arrangement of a zoom lens system at a tele position in accordance with the seventh preferred embodiment of the present invention;

FIG. 24 is an aberrational diagram of a zoom lens system showing an aspherical aberration, a sine condition, an astigmatism, and a distortion aberration at a tele position in accordance with the fifth preferred embodiment of the present invention;

FIG. 25 is an aberrational diagram of a zoom lens system showing an aspherical aberration, a sine condition, an astigmatism, and a distortion aberration at a wide position in accordance with the sixth preferred embodiment of the present invention;

FIG. 30 is an aberrational diagram of a zoom lens system showing an aspherical aberration, a sine condition, an astigmatism, and a distortion aberration at a tele position in accordance with the seventh preferred embodiment of the present invention.

FIG. 31 is a section view for explaining an arrangement of a conventional zoom lens system at a wide position and a tele position.

DETAILED DESCRIPTION OF PREFERRED EMBODIMENTS

Figure 2A:
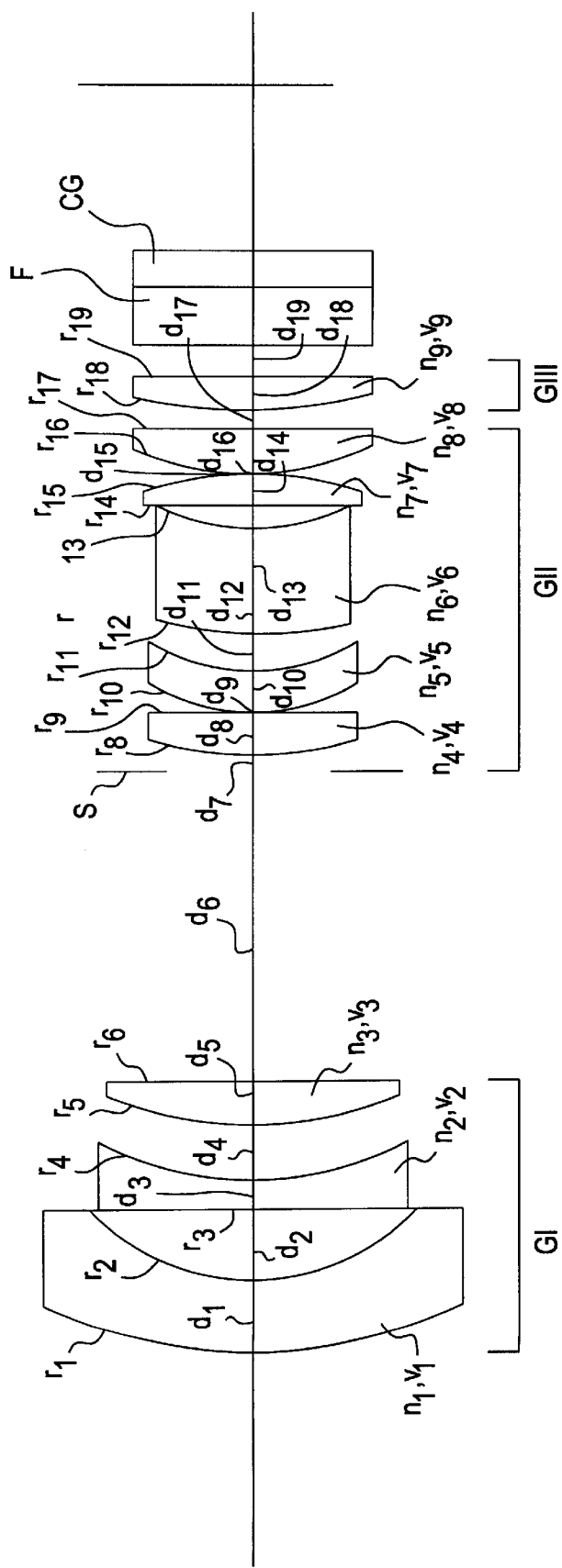
FIG. 2 (*a*) is a section view for explaining an arrangement of a zoom lens system at a wide position in accordance with a second preferred embodiment of the present invention.
Figure 2B:
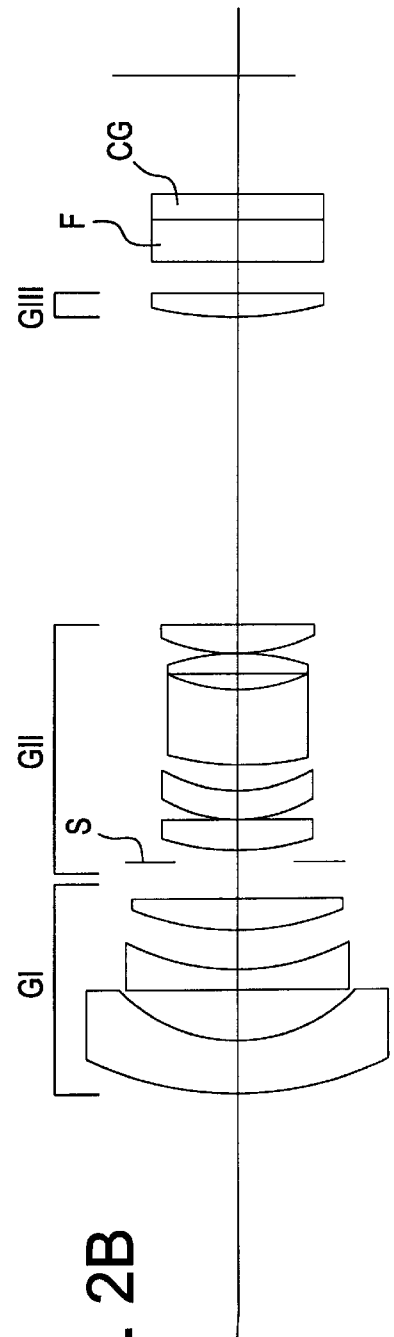
Figure 3A:
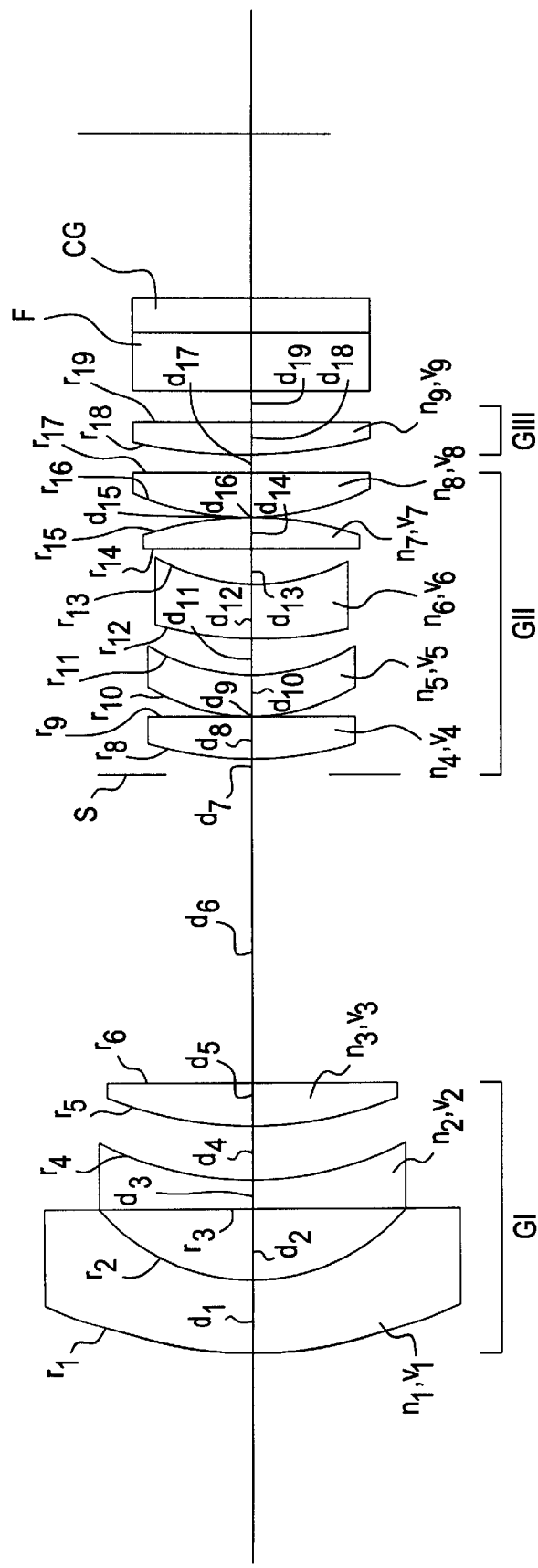
FIG. 3 (*a*) is a section view for explaining an arrangement of a zoom lens system at a wide position in accordance with a third preferred embodiment of the present invention.
Figure 3B:
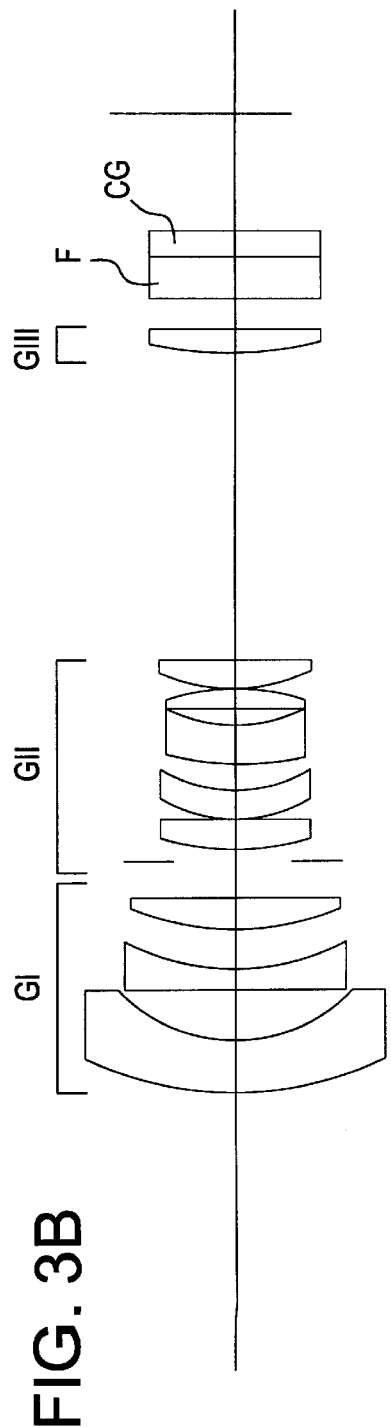
Figure 4A:
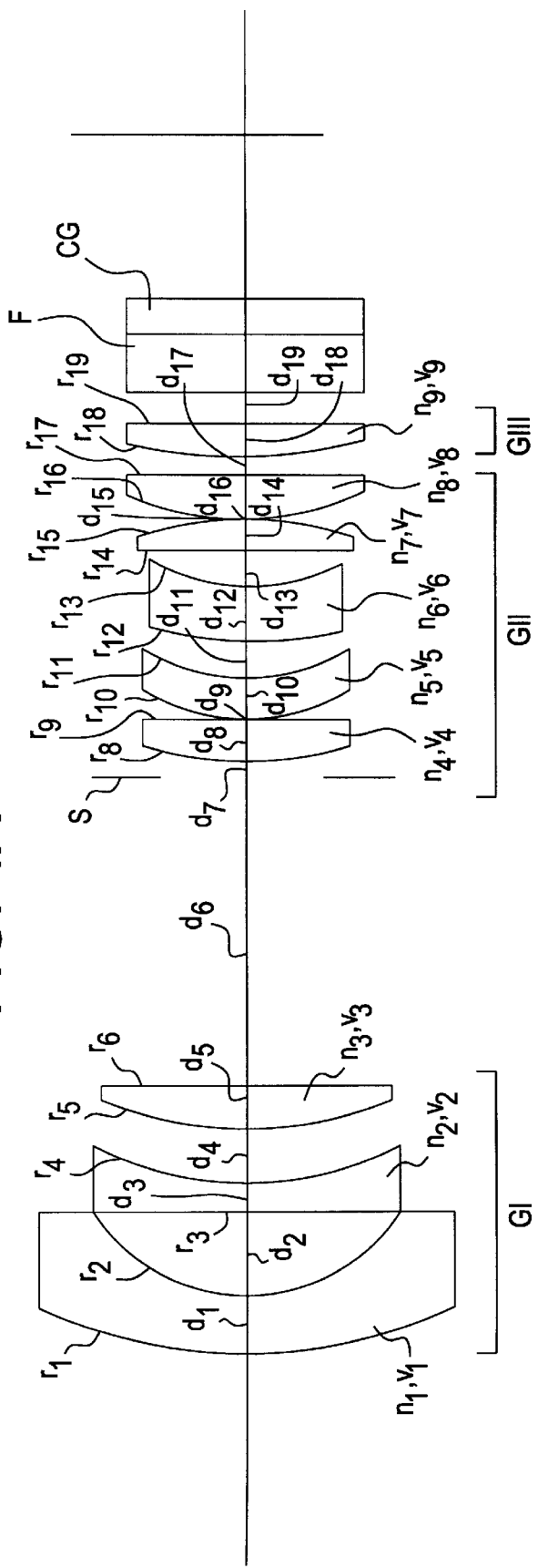
FIG. 4 (*a*) is a section view for explaining an arrangement of a zoom lens system at a wide position in accordance with a fourth preferred embodiment of the present invention.
Figure 4B:
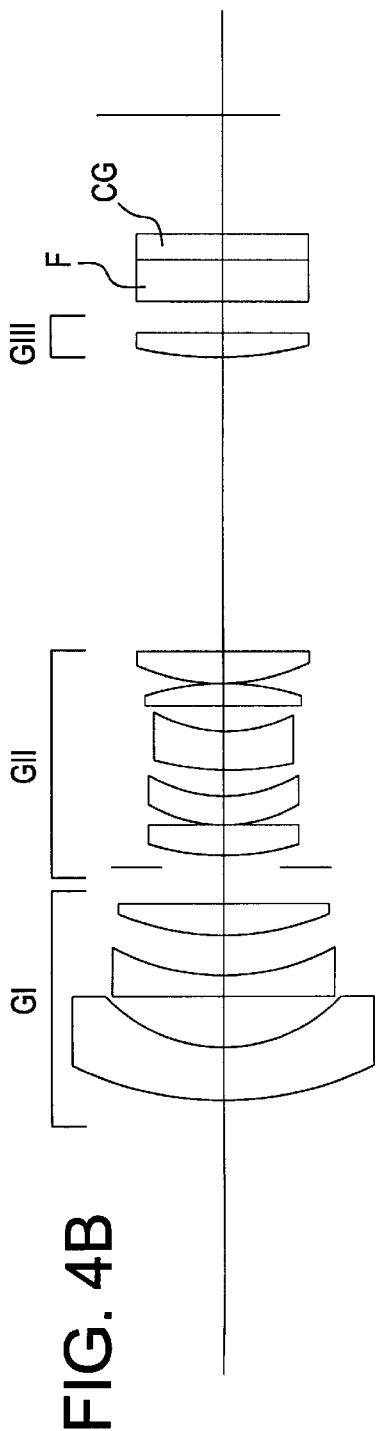
Figure 5:
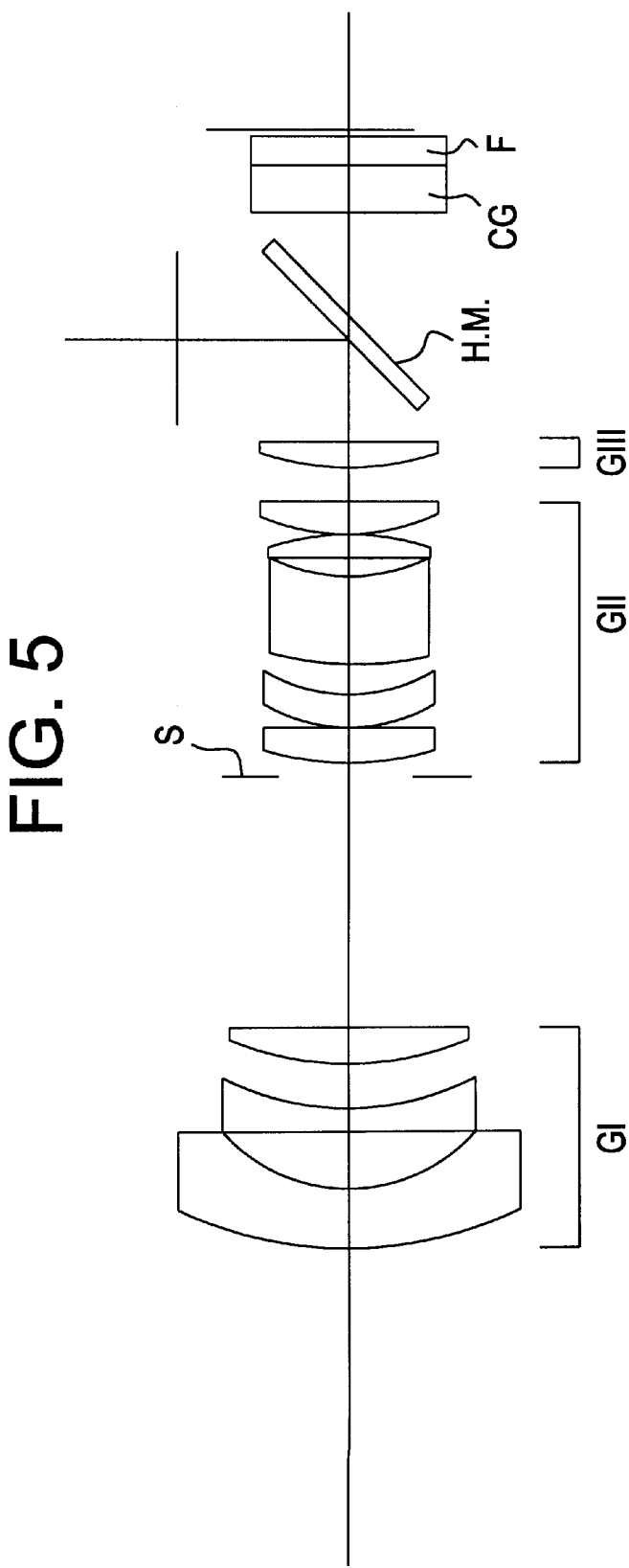
FIG. 5 is a section view for explaining an arrangement of a zoom lens system with a semi-transparent mirror in accordance with a preferred embodiment of the present invention.
Figure 6A:
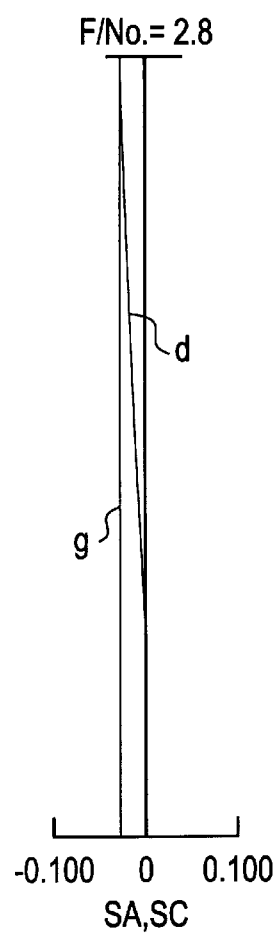
FIG. 6 is an aberrational diagram of a zoom lens system showing an aspherical aberration, a sine condition, an astigmatism, and a distortion aberration at a wide position in accordance with the first preferred embodiment of the present invention.
Figure 6B:
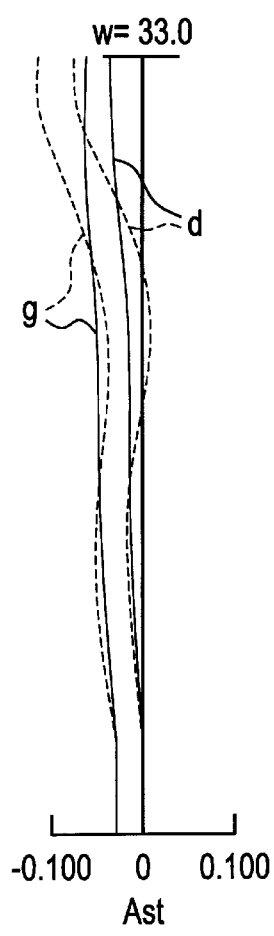
Figure 6C:
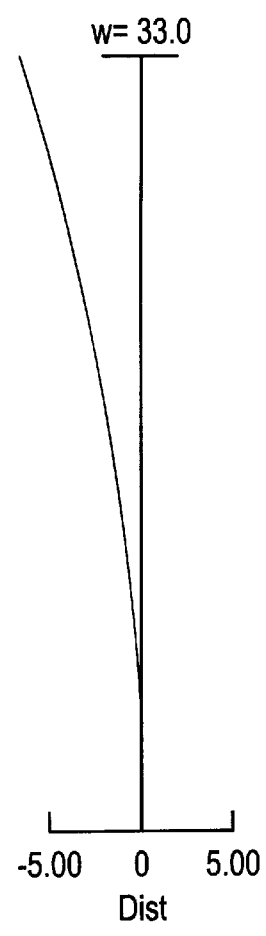
Figure 7A:
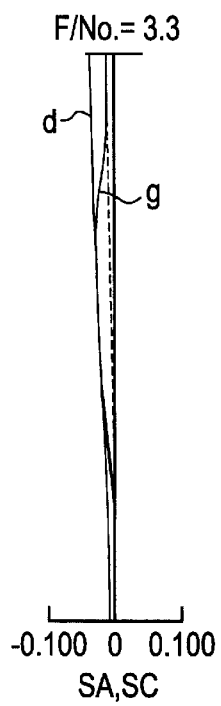
FIG. 7 is an aberrational diagram of a zoom lens system showing an aspherical aberration, a sine condition, an astigmatism, and a distortion aberration at a middle position in accordance with the first preferred embodiment of the present invention.
Figure 7B:
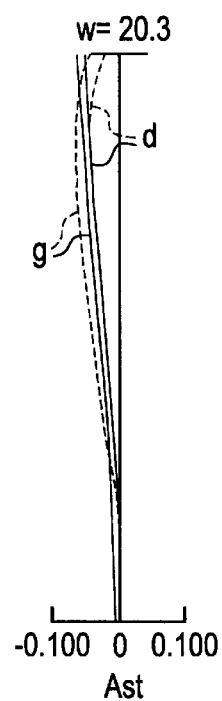
Figure 7C:
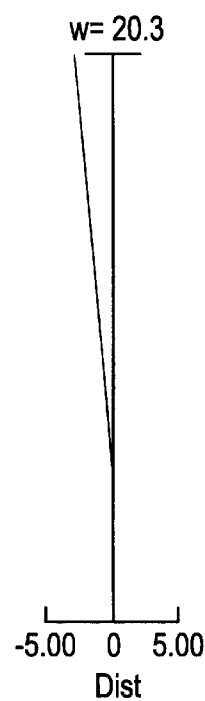
Figure 8A:
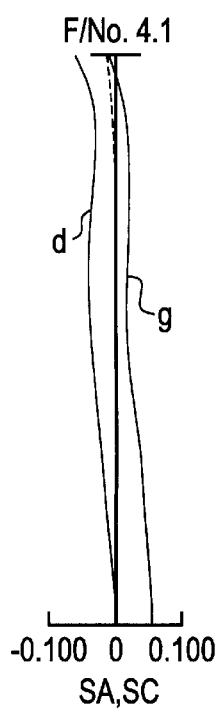
FIG. 8 is an aberrational diagram of a zoom lens system showing an aspherical aberration, a sine condition, an astigmatism, and a distortion aberration at a tele position in accordance with the first preferred embodiment of the present invention.
Figure 8B:
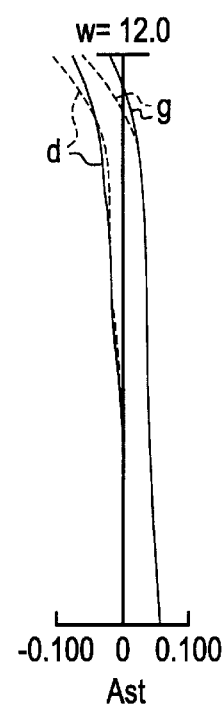
Figure 8C:
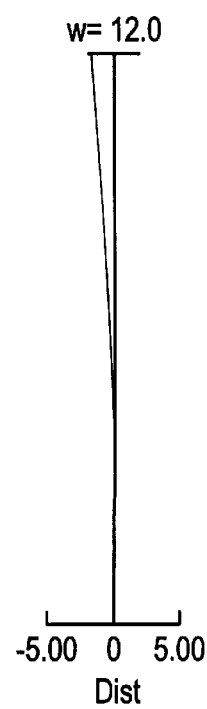
Figure 9A:
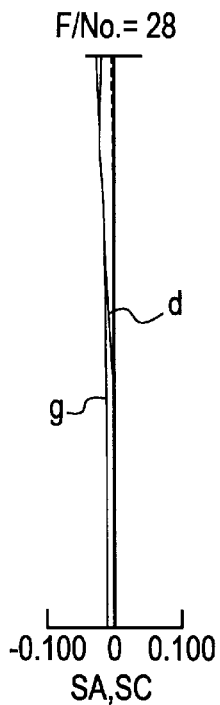
FIG. 9 is an aberrational diagram of a zoom lens system showing an aspherical aberration, a sine condition, an astigmatism, and a distortion aberration at a wide position in accordance with the second preferred embodiment of the present invention.
Figure 9B:
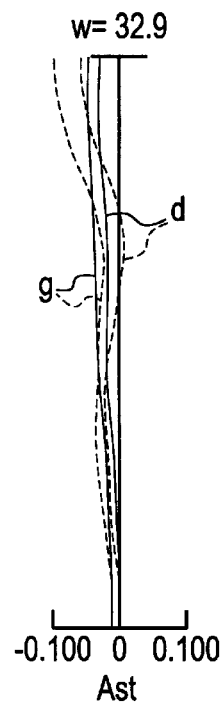
Figure 9C:
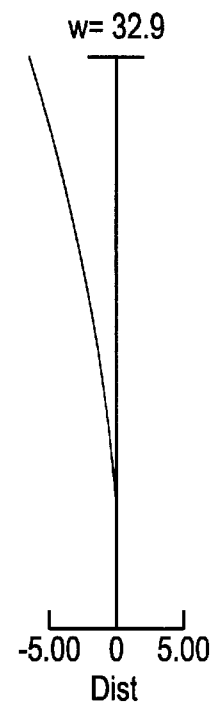
Figure 10A:
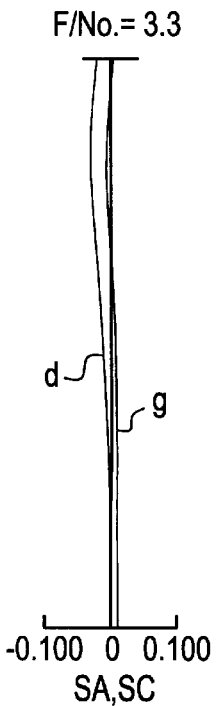
FIG. 10 is an aberrational diagram of a zoom lens system showing an aspherical aberration, a sine condition, an astigmatism, and a distortion aberration at a middle position in accordance with the second preferred embodiment of the present invention.
Figure 10B:
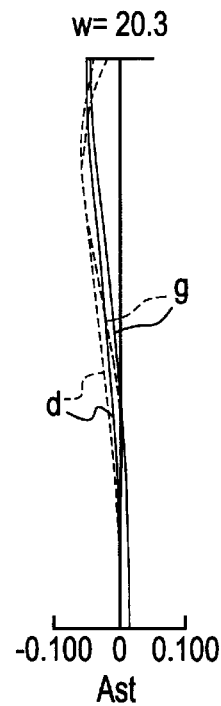
Figure 10C:
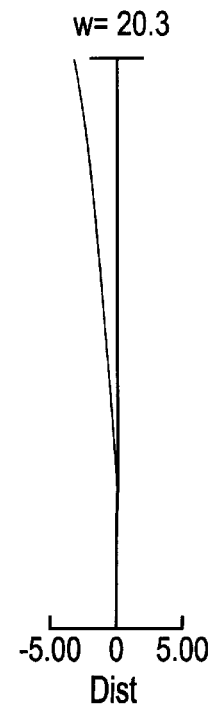
Figure 11A:
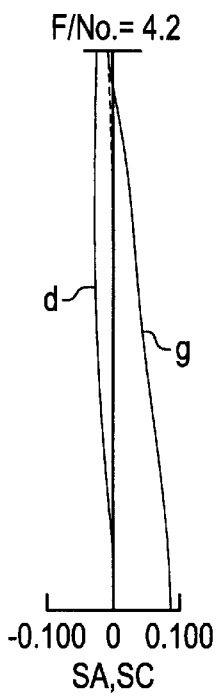
FIG. 11 is an aberrational diagram of a zoom lens system showing an aspherical aberration, a sine condition, an astigmatism, and a distortion aberration at a tele position in accordance with the second preferred embodiment of the present invention.
Figure 11B:
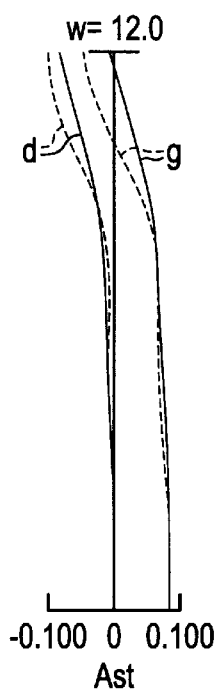
Figure 11C:
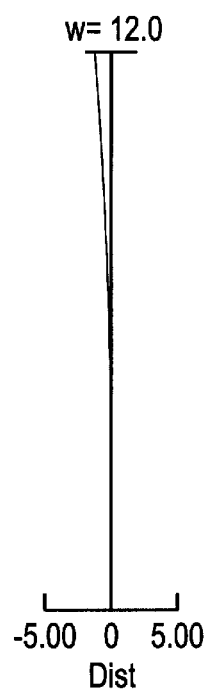
Figure 12A:
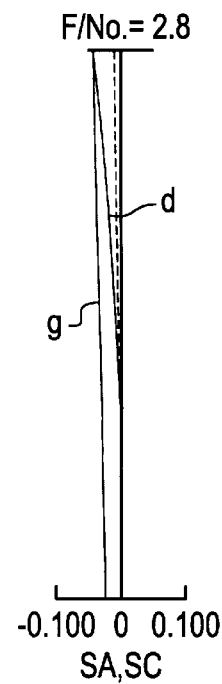
FIG. 12 is an aberrational diagram of a zoom lens system showing an aspherical aberration, a sine condition, an astigmatism, and a distortion aberration at a wide position in accordance with the third preferred embodiment of the present invention.
Figure 12B:
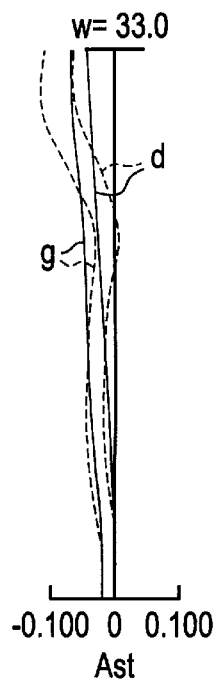
Figure 12C:
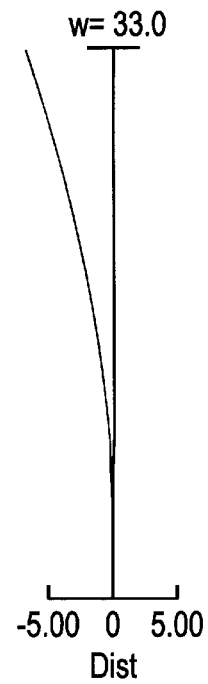
Figure 13A:
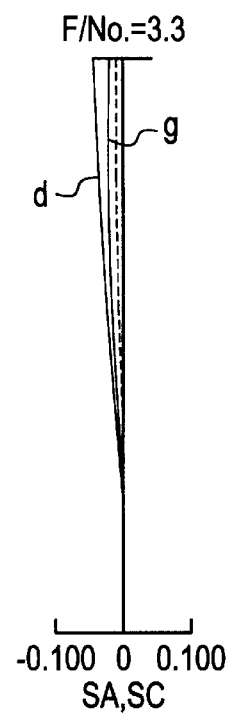
FIG. 13 is an aberrational diagram of a zoom lens system showing an aspherical aberration, a sine condition, an astigmatism, and a distortion aberration at a middle position in accordance with the third preferred embodiment of the present invention.
Figure 13B:
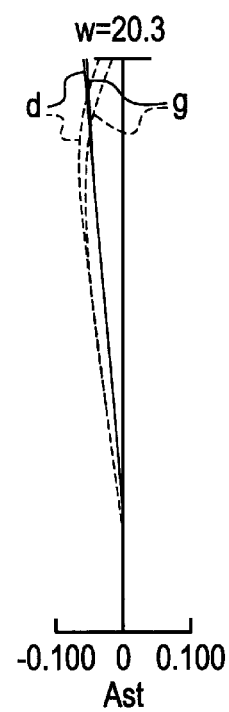
Figure 13C:
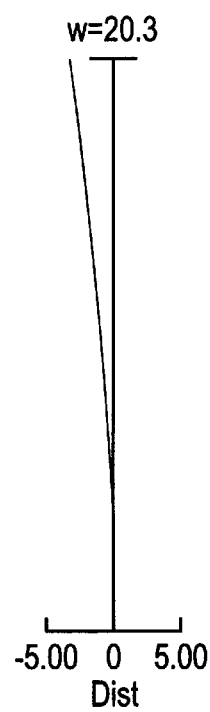
Figure 14A:
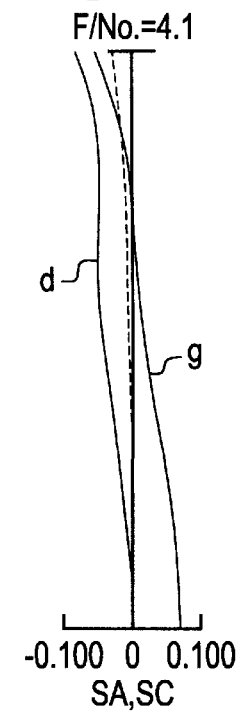
FIG. 14 is an aberrational diagram of a zoom lens system showing an aspherical aberration, a sine condition, an astigmatism, and a distortion aberration at a tele position in accordance with the third preferred embodiment of the present invention.
Figure 14B:
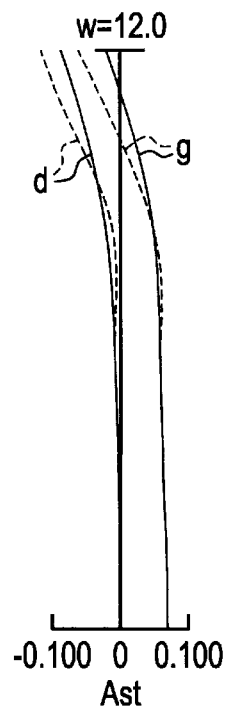
Figure 14C:
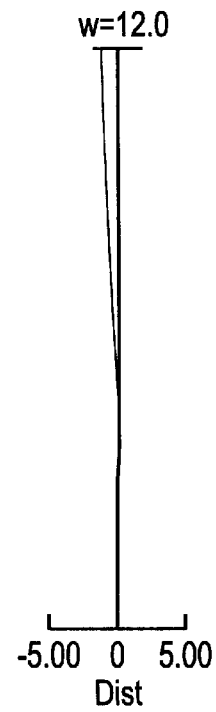
Figure 17A:
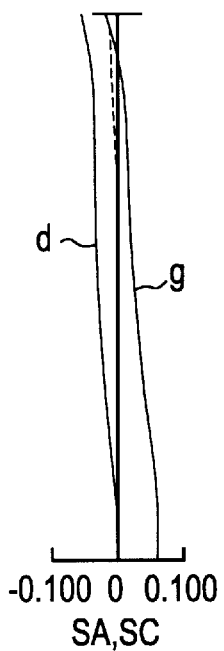
FIG. 17 is an aberrational diagram of a zoom lens system showing an aspherical aberration, a sine condition, an astigmatism, and a distortion aberration at a tele position in accordance with the fourth preferred embodiment of the present invention.
Figure 17B:
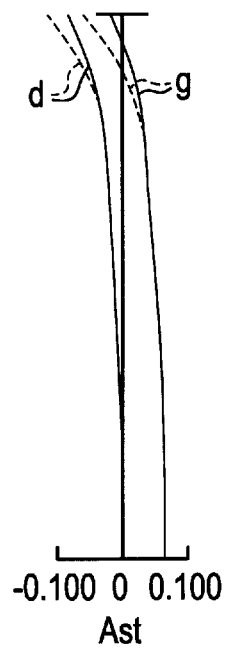
Figure 17C:
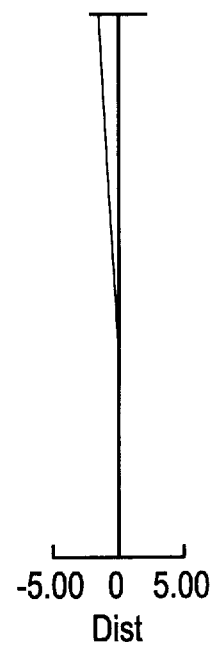
Figure 20A:
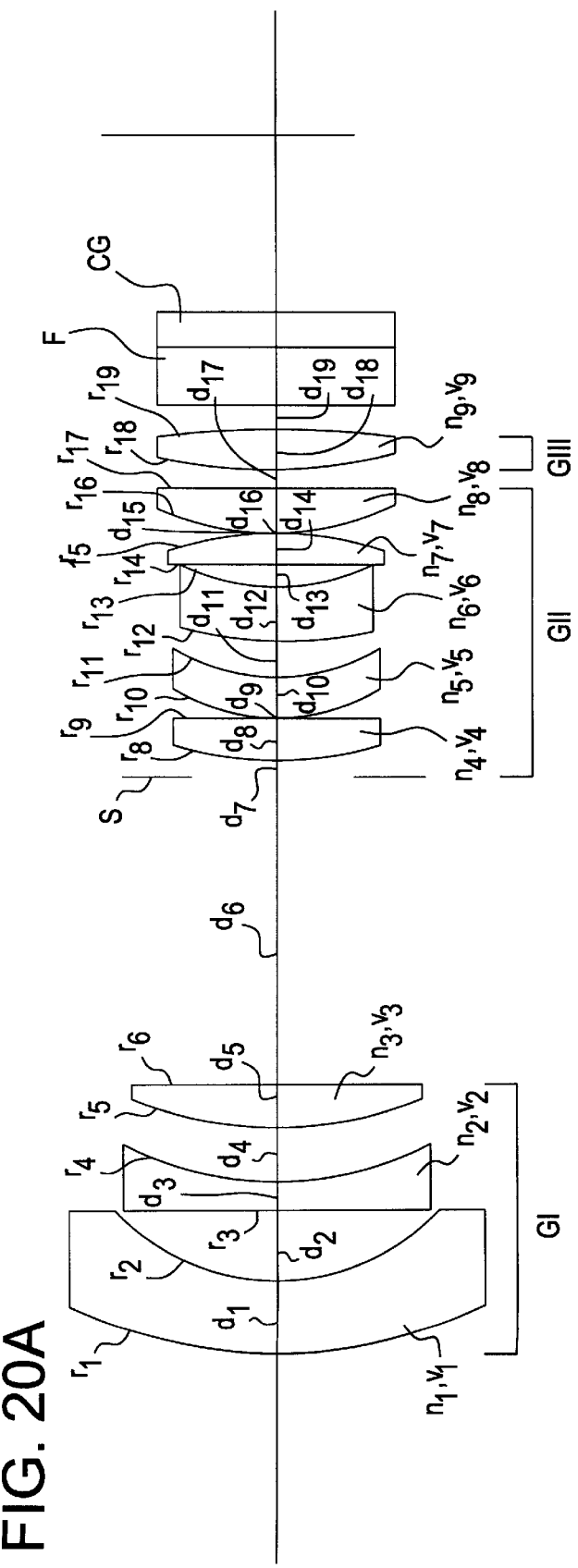
FIG. 20 (a) is a section view for explaining an arrangement of a zoom lens system at a wide position in accordance with a seventh preferred embodiment of the present invention.
Figure 20B:
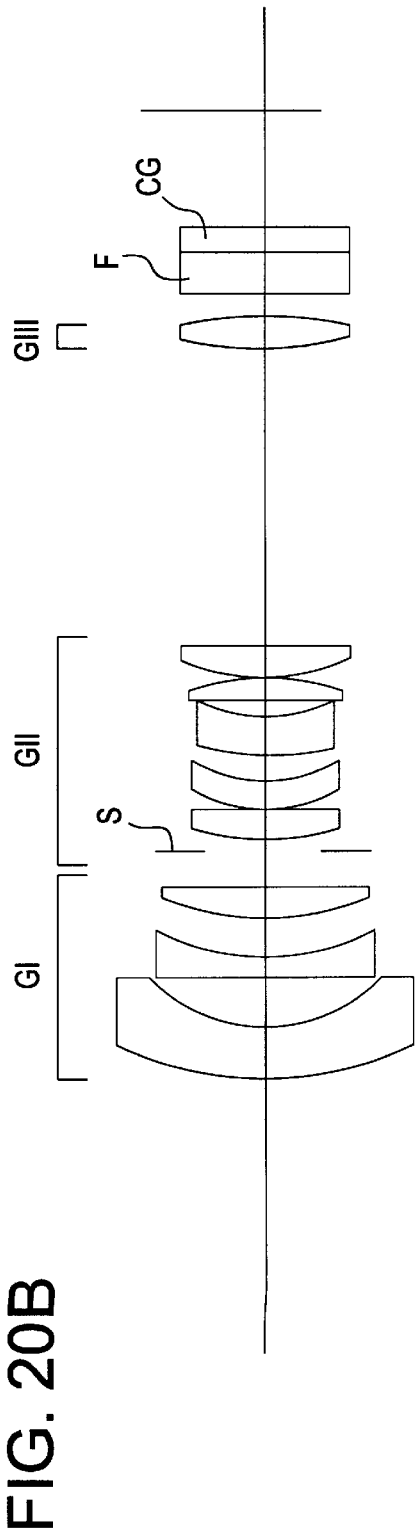
Figure 21:
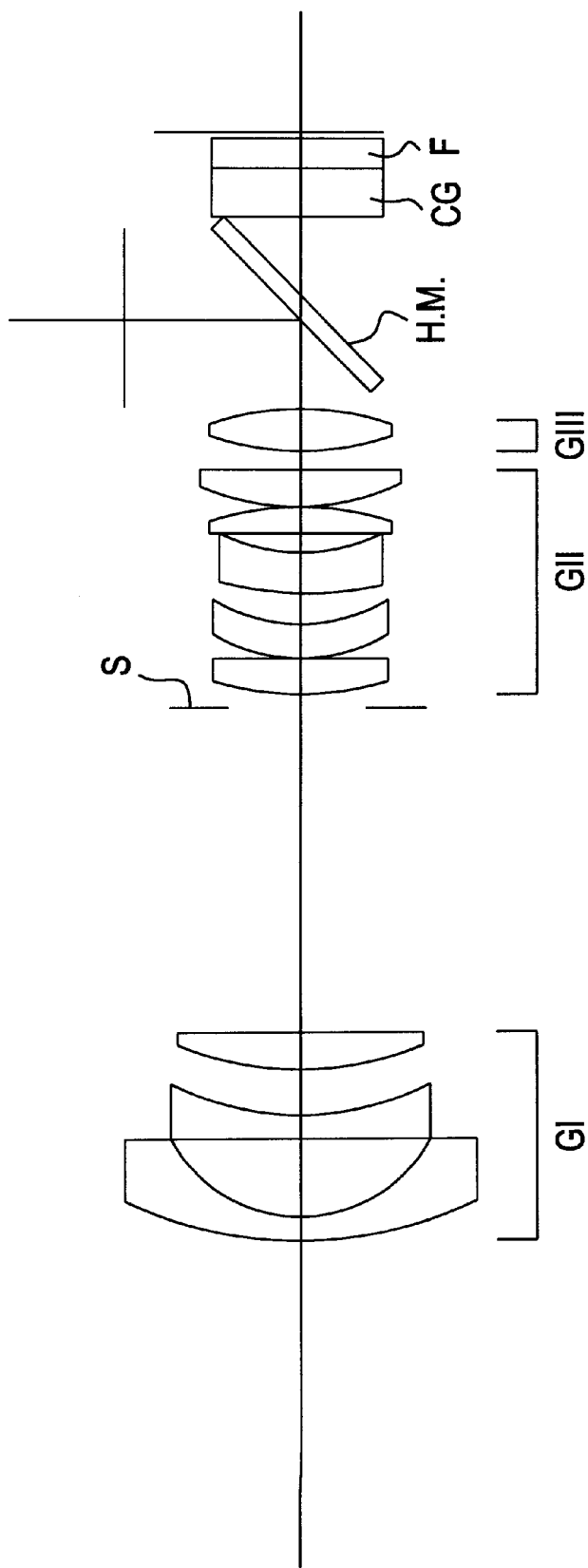
FIG. 21 is a section view for explaining an arrangement of a zoom lens system with a semi-transparent mirror in accordance a preferred embodiment of the present invention.
Figure 22A:
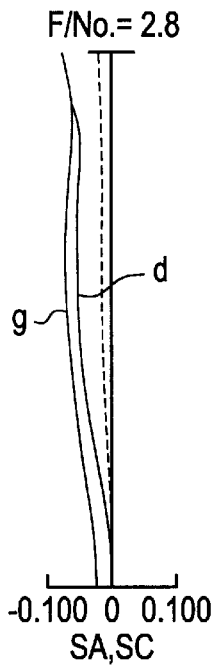
FIG. 22 is an aberrational diagram of a zoom lens system showing an aspherical aberration, a sine condition, an astigmatism, and a distortion aberration at a wide position in accordance with the fifth preferred embodiment of the present invention.
Figure 22B:
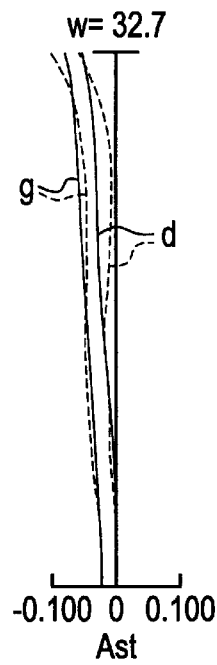
Figure 22C:
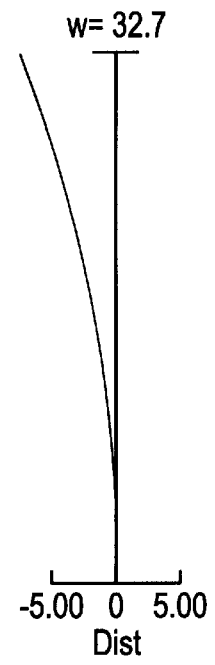
Figure 23A:
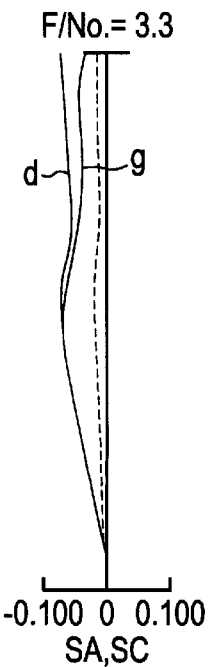
FIG. 23 is an aberrational diagram of a zoom lens system showing an aspherical aberration, a sine condition, an astigmatism, and a distortion aberration at a middle position in accordance with the fifth preferred embodiment of the present invention.
Figure 23B:
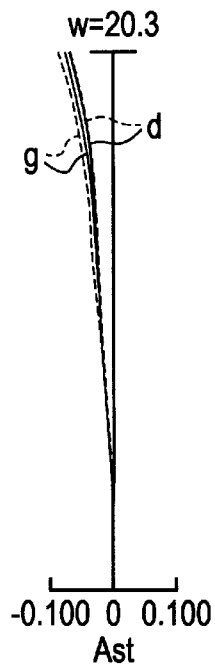
Figure 23C:
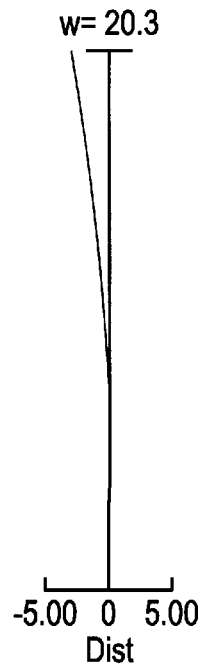
Figure 26A:
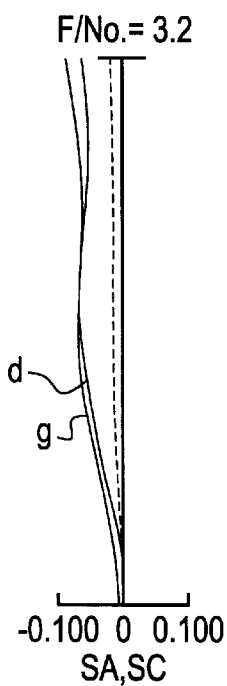
FIG. 26 is an aberrational diagram of a zoom lens system showing an aspherical aberration, a sine condition, an astigmatism, and a distortion aberration at a middle position in accordance with the sixth preferred embodiment of the present invention.
Figure 26B:
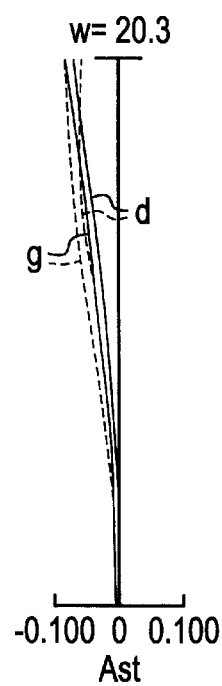
Figure 26C:
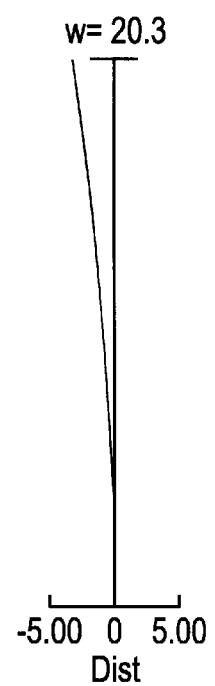
Figure 27A:
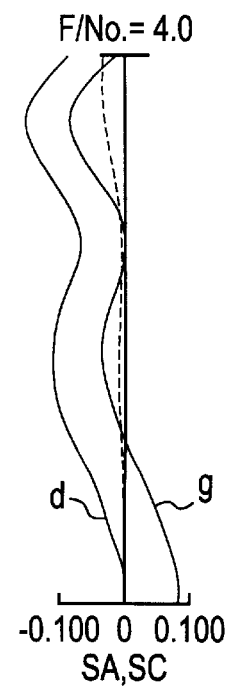
FIG. 27 is an aberrational diagram of a zoom lens system showing an aspherical aberration, a sine condition, an astigmatism, and a distortion aberration at a tele position in accordance with the sixth preferred embodiment of the present invention.
Figure 27B:
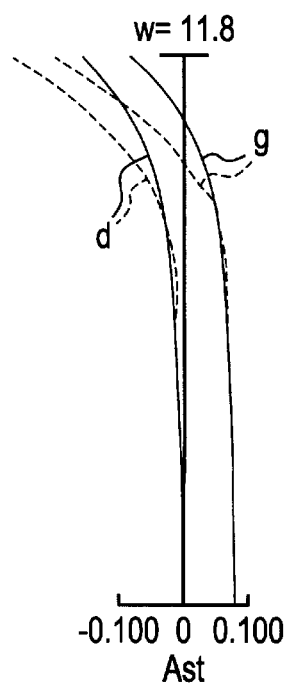
Figure 27C:
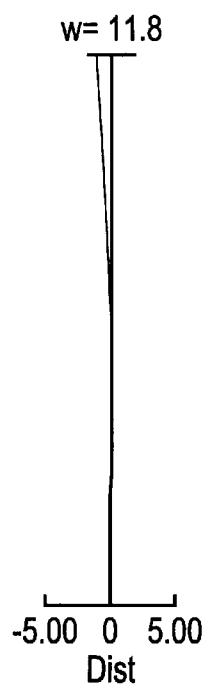
Figure 28A:
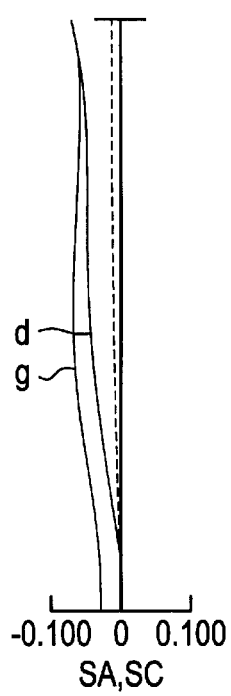
FIG. 28 is an aberrational diagram of a zoom lens system showing an aspherical aberration, a sine condition, an astigmatism, and a distortion aberration at a wide position in accordance with the seventh preferred embodiment of the present invention.
Figure 28B:
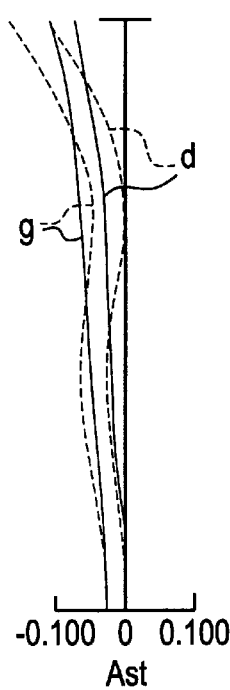
Figure 28C:
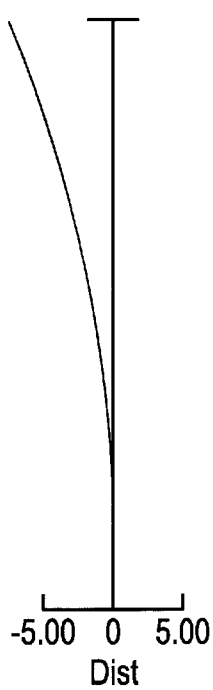
Figure 29A:
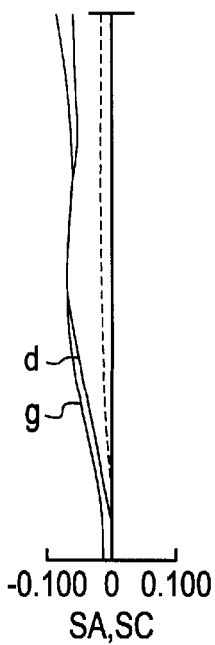
FIG. 29 is an aberrational diagram of a zoom lens system showing an aspherical aberration, a sine condition, an astigmatism, and a distortion aberration at a middle position in accordance with the seventh preferred embodiment of the present invention.
Figure 29B:
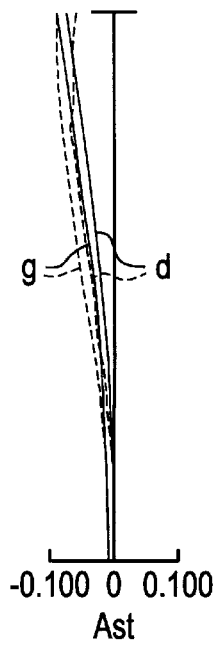
Figure 29C:

Preferred embodiments of an improved zoom lens system used in an image forming apparatus in accordance with preferred embodiments of the present invention will now be explained with reference to the accompanying drawings, wherein like reference numerals are utilized to designate identical or corresponding elements throughout the several views.

As seen in FIGS. 1a and 1b, a zoom lens system according to preferred embodiments of the present invention include, in order from an object side of the lens system, a first lens group having a negative refracting power, a second lens group spaced from the first lens group and having a positive refracting power and a third lens group spaced from the second lens group and having a positive refracting power.

The first lens group in the zoom lens system preferably has two negative lens disposed toward an object side so that a lens diameter of the zoom lens system can be small.

The second lens group in the zoom system preferably has, in order from an object side, a first positive meniscus lens, a second positive meniscus lens, a negative meniscus lens, a positive lens, and a third positive meniscus lens so that an aspherical aberration, an astigmatism, and a comatic aberration can be corrected effectively.

The third lens group preferably includes only a single lens so that the lens body tube can be made compact and the telecentric character can be improved.

According to a first preferred embodiment, at least one of a fifth lens surface and an eighth lens surface has an aspherical surface, the fifth and eighth lens surfaces being counted from the object side. It is also preferred that the aspherical surfaces at the fifth and eighth lens surfaces are convex.

According to a second preferred embodiment, both the fifth and the eighth lens surfaces are aspherical.

In the first and second preferred embodiments, it is preferred that the first aspherical surface is located in the first lens group and the second aspherical surface is located in the second lens group. More specifically, it is preferred that a positive lens in the first lens group has a first aspherical surface so that the distortion aberration in a negative direction at a wide position can be corrected effectively. In locating the first aspherical surface, the larger a distance from the optical axis in a direction perpendicular to the optical axis, the stronger the positive refracting power of the lens becomes.

It is preferred that the second aspherical lens surface be located at a first positive meniscus lens in the second lens group so that the aspherical aberration can be corrected effectively. In locating the second aspherical surface, the larger a distance from the optical axis in the direction perpendicular to the optical axis, the weaker the positive refracting power of the lens becomes.

In a second preferred embodiment of the present invention, both of the fifth and eighth lens surfaces have an aspherical convex surface.

With the novel structure and arrangement of the first and second preferred embodiments of the present invention, it is possible to provide a zoom lens system which has a magnification ratio of about 2.9 or greater and which is adapted for use with a camera having a color filter and CCD. This significant increase in magnification ratio is achieved by the provision of an aspherical surface at either or both of the fifth and eighth lens surfaces. More specifically, the provision of the aspherical surface at the fifth lens surface achieves a higher magnification ratio and correction of the distortion and aberrations when the lens system is in the wide position. The provision of an aspherical surface at the eighth lens surface achieves a higher magnification ratio and correction of distortions and aberrations when the lens system is in the tele position.

According to the features of a third preferred embodiment, a zoom lens system for use in a camera having a color filter and a CCD includes, in order from an object side of the lens system, a first lens group having a negative refracting power, a second lens group spaced from the first lens group and having a positive refracting power and a third lens group spaced from the second lens group and having a positive refracting power, wherein the second lens group includes five lenses. As seen in FIGS. 1a and 1b, an additional lens in the form of a fifth lens is added to the second lens group such that the second lens group has one more lens than the second lens group of the conventional zoom lens system of FIG. 31.

In the third preferred embodiment of the present invention, it is preferred that the additional lens be added to a far end of the second lens group, relative to the object side, so as to locate an exit pupil far from an image surface and to increase the back focus length. As a result of the addition of the fifth lens and location of the lens at the end of the second lens group, the magnification ratio and back focus are substantially increased and the distance between the image surface and the exit pupil is also substantially increased.

With the novel structure and arrangement of the third preferred embodiment, it is possible to achieve a zoom lens system for use with a camera having a color filter and CCD, the zoom lens having a back focus of at least about 9.2 or greater.

According to a fourth preferred embodiment, a zoom lens system for use in a camera having a color filter and a CCD includes in order from an object side of the lens system, a first lens group having a negative refracting power, a second lens group spaced from the first lens group and having a positive refracting power and a third lens group spaced from the second lens group and having a positive refracting power, wherein each of the first, second and third lens groups are movable from a first position when the lens system is in a wide position to a second position when the lens system is in a tele position.

In contrast to the prior art shown in FIG. 31, as seen in FIGS. 1a and 1b, the zoom lens system according to this fourth preferred embodiment arranges the third lens group to be movable toward an object side when the lens system is in the wide position and toward an image surface when the lens system is in the tele position. As a result of this movement, the aperture moves with the second lens group toward an object side, whereas the aperture in the prior art system of FIG. 31 remains fixed. The movement of the third lens group minimizes the total length between the first surface of the first lens group and the image surface. The movement of the third lens group also significantly increases the length of the back focus while maintaining the image accuracy and avoiding distortion. With the fourth preferred embodiment, it also possible to achieve a back focus of about 9.2 or greater.

It is important to note that each of the novel structural features and novel arrangement of structural elements of the four preferred embodiments described above can be combined together as desired.

For example, according to a fifth preferred embodiment including the structure shown in FIGS. 1a and 1b, a zoom lens system for use in a camera having a color filter and a CCD includes in order from an object side of the lens system, a first lens group having a negative refracting power, a second lens group spaced from the first lens group and having a positive refracting power and a third lens group spaced from the second lens group and having a positive refracting power, wherein each of a fifth and an eighth lens surface has an aspherical surface, the fifth and eighth lens surfaces being counted from the object side, the second lens group including five lenses, each of the first, second and third lens groups being movable from a first position when the lens system is in a wide position to a second position when the lens system is in a tele position. The zoom lens system according to the fifth preferred embodiment achieves a magnification ratio of about 2.9 or greater and a back focus of about 9.2 or greater.

In other preferred embodiments of the present invention, a zoom lens system includes, in order from an object side of the lens system, a first lens group having a negative refracting power, a second lens group spaced from the first lens group and having a positive refracting power and a third lens group spaced from the second lens group and having a positive refracting power, while also satisfying the conditions described in the following paragraphs.

In one such preferred embodiment, each of the five (5) following conditions are satisfied.
Condition 1

$$2.4K<|f_1|/f_w<2.6 \qquad f_1<0$$

wherein $f_1$ is a focal length of a first lens group in a zoom lens system and $f_w$ is a focal length of the zoom lens system at a wide position.

When the lower limit of the inequality is exceeded, the negative refracting power in the first lens group is significantly increased and an aspherical aberration and an astigmatism is deteriorated.

When the upper limit of the inequality is exceeded, the aspherical aberration and an astigmatism becomes improved but a lens body tube can not be made compact.
Condition 2

$$f_3/f_w<6.8 \qquad f_3>0$$

wherein $f_3$ is a focal length of a third lens group in the zoom lens system and $f_w$ is a focal length of the zoom lens system at the wide position.

When the upper limit of the inequality is exceeded, positive refracting power in the third lens group is weak and an exit pupil is shifted toward an image surface so as to deteriorate the telecentric character.
Condition 3

$$0.37 < f_2/f_3 < 0.41 \quad f_2 > 0$$

$$f_3 > 0$$

wherein $f_2$ is a focal length of a second lens group in the zoom lens system and $f_3$ is the focal length of the third lens group in the zoom lens system.

When the upper limit of the inequality is exceeded, negative refracting power in the third lens group is strengthened and positive refracting power in the second lens group is weak so that the lens body tube can not be made compact.

When the lower limit of the inequality is exceeded, negative refracting power in the third lens group becomes weak and positive refracting power in the second lens group becomes strong so that the aspherical aberration and the astigmatism is deteriorated.
Condition 4

$$0.37<bf_w/f_w$$

wherein $bf_w$ is a back focus at the wide position, which is a distance between a last lens surface of the third lens group and an image surface and $f_w$ is the focal length of the zoom lens system at the wide position.

When the lower limit of the inequality is exceeded, the back focus becomes shortened so that space can not be available for inserting an optical element such as a semi-transparent mirror.
Condition 5

$$1.52<|m(2T)|<1.65 \quad m(2T)<0$$

wherein m (2T) is a magnification of the second lens group in the zoom lens system at a tele position.

When the upper limit of the inequality is exceeded, a back focus becomes long at the tele position so that the lens body tube can not be made compact.

When the lower limit of the inequality is exceeded, negative refracting power in the first lens group is weak so that a shifting amount for the first lens group is increased.

In another preferred embodiment, each of the following five (5) conditions are preferably satisfied.
Condition 1a $$2.3<|f_1|/f_w<2.5 \qquad f_1<0$$

When the upper limit of the inequality is exceeded, negative refracting power in the first lens group becomes strong and an aspherical aberration and an astigmatism is deteriorated.

When the lower limit of the inequality is exceeded, negative refracting power in the first lens group becomes strong and an aspherical aberration and an astigmatism is deteriorated.
Condition 2a $$f_3/f_w<6.1 \qquad f_3>0$$

When the upper limit of the inequality is exceeded, positive refracting power in the third lens group is weak and an axis pupil is shifted toward an image surface so as to deteriorate telecentric character.
Condition 3a $$0.40 < f_2/f_3 < 0.44 \quad f_2 > 0$$

$$f_3 > 0$$

When the upper limit of the inequality is exceeded, negative refracting power in the third lens group is strong and positive refracting power in the second lens group is weak so that the lens body tube can not be made compact.

When the lower limit of the inequality is exceeded, negative refracting power in the third lens group is strong and positive refracting power in the second lens group is weak so that the lens body tube can not be made compact.
Condition 4a $$1.70<bf_w/f_w$$

When the lower limit of the inequality is exceeded, the back focus becomes shortened so that space can not be available for inserting an optical element such as a semi-transparent mirror.
Condition 5a $$1.70<|m(2T)|<1.74 \qquad m(2T)<0$$

When the upper limit of the inequality is exceeded, a back focus becomes long at the tele position so that the lens body tube can not be made compact.

When the lower limit of the inequality is exceeded, negative refracting power in the first lens group becomes weak so that a shifting amount for the first lens group is increased.

EXAMPLES

Several examples of actual zoom lens systems constructed according to the preferred embodiments of the present invention, including specific measured numeric values of parameters of the zoom lens system shown in each of Figures, are set forth below.

In these examples of the zoom lens system according to the preferred embodiments of the present invention, $r_i$(i=1 to 22) designates a radius of curvature of i-th lens surface, which is counted from the object side; $d_i$(i=1 to 21) designates a distance between the i-th lens surface and the (i+1)-th lens surface on the optical axis, which is counted from the object side; $n_j$ (j=1 to 11) designates a refractive index of a material of a j-th lens, which is counted from the object side; $v_j$(j=1 to 11) designates an Abbe's number of the j-th lens, which is counted from the object side; CG designates a cover glass; F designates a low-pass filter and an infrared cut filter; f designates a focal length of the zoom lens system; ω designates a half field angle of the zoom lens system; F/NO designates a brightness of the zoom lens system; Y' designates an image height of the zoom lens system; $f_{1-3}$ designates a focal length of the first through third lens group in the zoom lens system; $f_w$ designates a focal length of the zoom lens system at a wide position; M(2T) designates magnification of the second lens group in the zoom lens system at a tele position; TL designates a total length of the zoom lens system at the wide position.

In the following description for the first and second preferred embodiments including one or two aspherical surfaces located at the fifth and/or eighth lens surfaces, respectively, an x-coordinate is set to be in conformity with the optical axis of the lens, and a Y-coordinate is set to be perpendicular to the optical axis of the lens.

In the equation set forth below, r designates a radius of curvature of a surface on the optical axis, k designates a conical constant, and a, b, c and d designate aspherical coefficients of higher orders. In this case, as is well known, the aspherical surface is provided by a curved surface obtained by rotating a curve represented by the following formula around the optical axis of the lens.

$$z = (Y^2/r)\Big/\sqrt{[1+(1-k)(Y/r)^2)]} + a \cdot Y^4 + b \cdot Y^6 + c \cdot Y^8 + d \cdot Y^{10} + \ldots$$

A shape of the aspherical surface is specified by providing the radius of curvature on the optical axis of the lens, the conical constant and the aspherical coefficients of higher orders.

With respect to the aspherical coefficients, E and a number subsequent to this E designate a power. For example, E-9 shows $1/10^9$ and this value $1/10^9$ is multiplied by a numerical value which appears before the E.

Example 1 f = 5.2–15.0 mm, F/No. = 2.8–4.1, ω = 33.0–12.0°
Y' = 3. 15, TL = 48.03 mm

| i | $r_i$ | $d_i$ | j | $n_j$ | $v_j$ |
|---|---|---|---|---|---|
| 1 | 16.161 | 2.37 | 1 | 1.69680 | 55.46 |
| 2 | 6.633 | 2.39 | | | |
| 3 | −225.404 | 0.80 | 2 | 1.69680 | 55.46 |
| 4 | 9.846 | 1.88 | | | |
| 5 | 18.316 | 1.20 | 3 | 1.82027 | 29.70 |
| 6 | −851.455 | variable | | | |
| 7 | ∞ | 0.50 | | | |
| 8 | 9.189 | 1.45 | 4 | 1.69350 | 53.20 |
| 9 | 66.740 | 0.10 | | | |
| 10 | 6.770 | 1.34 | 5 | 1.60311 | 60.69 |
| 11 | 8.572 | 1.20 | | | |
| 12 | 23.789 | 1.63 | 6 | 1.84666 | 23.78 |
| 13 | 5.961 | 1.24 | | | |
| 14 | −68.280 | 1.14 | 7 | 1.48749 | 70.44 |
| 15 | −11.535 | 0.10 | | | |
| 16 | 9.699 | 1.37 | 8 | 1.48749 | 70.44 |
| 17 | 100.231 | variable | | | |
| 18 | 15.312 | 1.16 | 9 | 1.48749 | 70.44 |
| 19 | 149.289 | variable | | | |
| 20 | ∞ | 2.00 | 10 | 1.51680 | 64.20 |
| 21 | ∞ | 1.10 | 11 | 1.54072 | 47.20 |
| 22 | ∞ | | | | | aspherical 5th surface

K = 1.31712,          A = 1.61687 E-4,
B = −5.24932 E-6,     C = 4.02803 E-7,
D = −9.24138 E-9 aspherical 8th surface

K = −0.73713,         A = −6.46089 E-6,
B = −3.23545 E-7,     C = 4.89215 E-8 variable amounts

| f | 5.20 | 8.80 | 14.99 |
|---|---|---|---|
| $d_6$ | 18.14 | 7.76 | 1.60 |
| $d_{17}$ | 0.60 | 5.31 | 13.63 |
| $d_{19}$ | 1.00 | 1.11 | 1.18 | conditions amounts $|f_1|/f_w = 2.58$, $f_3/f_w = 6.71$,
$f_2/f_3 = 0.381$, $bf_w/f_w = 1.812$, $|m(2T)| = 1.531$

Example 2 f = 5.2–15.0 mm, F/No. = 2.8–4.2, ω = 32.9–12.0°
Y' = 3.15, TL = 46.81 mm

| i | $r_i$ | $d_i$ | j | $n_j$ | $v_j$ |
|---|---|---|---|---|---|
| 1. | 14.424 | 1.96 | 1 | 1.69680 | 55.46 |
| 2. | 6.106 | 2.44 | | | |
| 3. | −73.560 | 0.80 | 2 | 1.69680 | 55.46 |
| 4. | 9.657 | 1.80 | | | |
| 5. | 20.027 | 1.22 | 3 | 1.82027 | 29.70 |
| 6. | −85.450 | variable | | | |
| 7. | ∞ (stop) | 0.50 | | | |
| 8. | 7.944 | 1.59 | 4 | 1.58313 | 59.46 |
| 9. | 109.482 | 0.10 | | | |
| 10. | 9.802 | 1.42 | 5 | 1.62299 | 58.12 |
| 11. | 14.971 | 0.47 | | | |
| 12. | 27.852 | 3.50 | 6 | 1.84666 | 23.78 |
| 13. | 5.860 | 1.10 | | | |
| 14. | −37.539 | 1.06 | 7 | 1.51680 | 64.20 |
| 15. | −11.703 | 0.10 | | | |
| 16. | 9.189 | 1.43 | 8 | 1.48749 | 70.44 |
| 17. | 249.631 | variable | | | |
| 18. | 16.001 | 1.13 | 9 | 1.48749 | 70.44 |
| 19. | −6562.634 | variable | | | |
| 20. | ∞ | 2.00 | 10 | 1.51680 | 64.20 |

-continued

| | | | | | |
|---|---|---|---|---|---|
| 21. | ∞ | 1.10 | 11 | 1.54072 | 47.20 |
| 22. | ∞ | | | | | aspherical 5th surface

K = 2.34112        A = 2.04080 E-4
B = −7.44541 E-6   C = 6.31926 E-7
D = −1.63835 E-8 aspherical 8th surface

K = −0.87529       A = −9.21866 E-6
B = 2.11793 E-6    C = −9.42830 E-8 variable amounts

| f | 5.20 | 8.80 | 15.00 |
|---|---|---|---|
| $d_6$ | 16.57 | 7.03 | 1.60 |
| $d_{17}$ | 0.40 | 5.12 | 14.38 |
| $d_{19}$ | 1.00 | 1.30 | 1.02 | conditions amounts $|f_1|/f_w$ = 2.41, $f_3/f_w$ = 6.30.
$f_2/f_3$ = 0.398, $bf_w/f_w$ = 1.774, $|m(2T)|$ = 1.643

Example 3 f = 5.2–15.0 mm, F/No. = 2.8–4.1, ω = 33.0–12.0°
Y' = 3.15, TL = 46.03 mm

| i | $r_j$ | $d_j$ | j | $n_j$ | $v_j$ |
|---|---|---|---|---|---|
| 1 | 14.203 | 1.54 | 1 | 1.69680 | 55.46 |
| 2 | 6.333 | 2.42 | | | |
| 3 | −90.860 | 0.80 | 2 | 1.69680 | 55.46 |
| 4 | 10.036 | 1.85 | | | |
| 5 | 18.928 | 1.19 | 3 | 1.82027 | 29.70 |
| 6 | −217.502 | Variable | | | |
| 7 | ∞ | 0.50 | | | |
| 8 | 7.841 | 1.57 | 4 | 1.62299 | 58.12 |
| 9 | 62.256 | 0.10 | | | |
| 10 | 7.121 | 1.50 | 5 | 1.62299 | 58.12 |
| 11 | 8.038 | 1.06 | | | |
| 12 | 19.797 | 1.51 | 6 | 1.84666 | 23.78 |
| 13 | 5.739 | 1.13 | | | |
| 14 | 70.922 | 1.21 | 7 | 1.48749 | 70.44 |
| 15 | −12.184 | 0.11 | | | |
| 16 | 8.647 | 1.28 | 8 | 1.48749 | 70.44 |
| 17 | 23.057 | Variable | | | |
| 18 | 17.015 | 1.11 | 9 | 1.48749 | 70.44 |
| 19 | −615.325 | Variable | | | |
| 20 | ∞ | 2.00 | 10 | 1.51680 | 64.20 |
| 21 | ∞ | 1.10 | 11 | 1.54072 | 47.20 |
| 22 | ∞ | | | | | aspherical 5th surface

K = 1.42417        A = 1.81723 E-4
B = −7.19447 E-6   C = 5.75794 E-7
D = −1.44505 E-8 aspherical 8th surface

K = −0.76096       A = −2.70796 E-6
B = 1.22371 E-6    C = −2.21855 E-8 variable amounts

| f | 5.20 | 8.80 | 15.00 |
|---|---|---|---|
| $d_6$ | 17.29 | 7.38 | 1.60 |
| $d_{17}$ | 0.65 | 5.25 | 13.79 |
| $d_{19}$ | 1.00 | 1.18 | 1.07 | conditions amounts $|f_1|/f_w$ = 2.50, $f_3/f_w$ = 6.54,
$f_2/f_3$ = 0.382, $bf_w/f_w$ = 1.771, $|m(2T)|$ = 1.564

Example 4 f = 5.2–15.0 mm, F/No. = 2.8–4.1, ω = 33.0–12.0°
Y' = 3.15, TL = 46.04 mm

| i | $r_j$ | $d_j$ | j | $n_j$ | $v_j$ |
|---|---|---|---|---|---|
| 1 | 14.397 | 1.60 | 1 | 1.69680 | 55.46 |
| 2 | 6.347 | 2.41 | | | |
| 3 | −140.592 | 0.80 | 2 | 1.69680 | 55.46 |
| 4 | 9.554 | 1.80 | | | |
| 5 | 18.101 | 1.21 | 3 | 1.82027 | 29.70 |
| 6 | −340.398 | Variable | | | |
| 7 | ∞ | 0.50 | | | |
| 8 | 7.954 | 1.50 | 4 | 1.69350 | 53.20 |
| 9 | 43.225 | 0.10 | | | |
| 10 | 6.751 | 1.25 | 5 | 1.51680 | 64.20 |
| 11 | 8.225 | 1.23 | | | |
| 12 | 21.991 | 1.40 | 6 | 1.84666 | 23.78 |
| 13 | 5.741 | 1.15 | | | |
| 14 | −568.521 | 1.18 | 7 | 1.51680 | 64.20 |
| 15 | −11.999 | 0.10 | | | |
| 16 | 8.741 | 1.33 | 8 | 1.48749 | 70.44 |
| 17 | 32.594 | Variable | | | |
| 18 | 15.194 | 1.16 | 9 | 1.48749 | 70.44 |
| 19 | 223.459 | Variable | | | |
| 20 | ∞ | 2.00 | 10 | 1.51680 | 64.20 |
| 21 | ∞ | 1.10 | 11 | 1.54072 | 47.20 |
| 22 | ∞ | | | | | aspherical 5th surface

K = 1.35582,       A = 1.88966 E-4
B = −6.89852 E-6   C = 5.65782 E-7
D = −1.40667 E-8 aspherical 8th surface

K = −0.0293        A = −6.33333 E-6
B = 1.228960 E-6   C = −2.94688 E-8 variable amounts

| f | 5.20 | 8.80 | 14.98 |
|---|---|---|---|
| $d_6$ | 17.14 | 7.32 | 1.60 |
| $d_{17}$ | 0.96 | 5.71 | 14.49 |
| $d_{19}$ | 1.00 | 1.18 | 1.08 | conditions amounts $|f_1|/f_w$ = 2.48, $f_3/f_w$ = 6.42,
$f_2/f_3$ = 0.393, $bf_w/f_w$ = 1.774, $|m(2T)|$ = 1.595

Example 5 f = 5.3–15.6 mm, F/No. = 2.8–4.1, ω = 32.7–11.5°
Y' = 3.15 TL = 44.09 mm

| i | $r_j$ | $d_j$ | j | $n_j$ | $v_j$ |
|---|---|---|---|---|---|
| 1 | 16.752 | 0.80 | 1 | 1.69680 | 55.46 |
| 2 | 6.487 | 2.37 | | | |
| 3 | −247.640 | 0.80 | 2 | 1.69680 | |
| 4 | 9.847 | 1.43 | | | |
| 5 | 14.212 | 1.30 | 3 | 1.82027 | 29.70 |
| 6 | 119.878 | Variable | | | |
| 7 | ∞ | 0.50 | | | |
| 8 | 10.150 | 1.48 | 4 | 1.58313 | 59.46 |
| 9 | ∞ | 0.10 | | | |
| 10 | 5.705 | 1.09 | 5 | 1.69350 | 50.79 |
| 11 | 6.867 | 1.77 | | | |
| 12 | 14.552 | 0.80 | 6 | 1.84666 | 23.78 |
| 13 | 5.423 | 1.20 | | | |
| 14 | 19.326 | 1.40 | 7 | 1.48749 | 70.44 |
| 15 | −13.107 | 0.10 | | | |
| 16 | 6.626 | 1.13 | 8 | 1.48749 | 70.44 |
| 17 | 8.101 | Variable | | | |
| 18 | 21.274 | 1.18 | 9 | 1.48749 | 70.44 |
| 19 | −52.058 | Variable | | | |
| 20 | ∞ | 2.00 | 10 | 1.51680 | 64.20 |

-continued

| | | | | | |
|---|---|---|---|---|---|
| 21 | ∞ | 1.10 | 11 | 1.54072 | 47.20 |
| 22 | ∞ | | | | | aspherical 5th surface

K = 0.90292  A = 1.29148 E-4
B = −3.20515 E-6  C = 2.417 E-7
D = −5.44885 E-9 aspherical 8th surface

K = −0.60047  A = 9.4783 E-6
B = −3.25212 E-5  C = 3.91974 E-6
D = −1.67937 E-7 variable amounts

| f | 5.30 | 8.80 | 15.60 |
|---|---|---|---|
| $d_6$ | 16.29 | 7.13 | 1.60 |
| $d_{17}$ | 1.15 | 5.30 | 15.64 |
| $d_{19}$ | 1.00 | 1.61 | 1.23 | conditions amounts $|f_1|/|f_w| = 2.37$, $f_3/f_w = 5.87$,
$f_2/f_3 = 0.416$, $bf_w/f_w = 1.735$, $|m(2T)| = 1.739$ Example 6 f = 5.2–15.0 mm, F/No. = 2.8–4.0, ω = 33.3–11.8°
Y' = 3.15 TL = 43.07 mm

| i | $r_j$ | $d_j$ | j | $n_j$ | $v_j$ |
|---|---|---|---|---|---|
| 1 | 17.091 | 0.80 | 1 | 1.69680 | 55.46 |
| 2 | 6.455 | 2.47 | | | |
| 3 | 132.708 | 0.80 | 2 | 1.69680 | 55.46 |
| 4 | 9.063 | 1.06 | | | |
| 5 | 11.341 | 1.43 | 3 | 1.82027 | 29.70 |
| 6 | 43.745 | Variable | | | |
| 7 | ∞ | 0.50 | | | |
| 8 | 10.324 | 1.57 | 4 | 1.58313 | 59.46 |
| 9 | −49.518 | 0.10 | | | |
| 10 | 5.529 | 1.12 | 5 | 1.74400 | 44.90 |
| 11 | 6.711 | 1.31 | | | |
| 12 | 16.475 | 0.80 | 6 | 1.80835 | 22.62 |
| 13 | 5.254 | 1.33 | | | |
| 14 | −15.225 | 1.03 | 7 | 1.48749 | 70.44 |
| 15 | −9.451 | 0.10 | | | |
| 16 | 10.330 | 1.41 | 8 | 1.48749 | 70.44 |
| 17 | −1127.040 | Variable | | | |
| 18 | 24.171 | 1.23 | 9 | 1.48749 | 70.44 |
| 19 | −35.417 | Variable | | | |
| 20 | ∞ | 2.00 | 10 | 1.51680 | 64.20 |
| 21 | ∞ | 1.10 | 11 | 1.54072 | 47.20 |
| 22 | ∞ | | | | | aspherical 5th surface

K = 0.89517,  A = 1.18073 E-4
B = −6.5843 E-6  C = 4.00323 E-7
D = −8.35432 E-9 aspherical 8th surface

K = −0.68465  A = −1.158357 E-5
B = −3.32933 E-5  C = 4.15334 E-6
D = −1.82058 E-7 variable amounts

| f | 5.20 | 8.80 | 15.19 |
|---|---|---|---|
| $d_6$ | 15.08 | 6.38 | 1.60 |
| $d_{17}$ | 0.47 | 4.00 | 14.91 |
| $d_{19}$ | 1.00 | 2.11 | 1.00 | conditions amounts $|f_1|/|f_w| = 2.44$, $f_3/f_w = 5.70$,
$f_2/f_3 = 0.434$, $bf_w/f_w = 1.820$, $|m(2T)| = 1.708$ Example 7 f = 5.2–15.2 mm, F/No. = 2.8–4.1, ω = 33.2–11.8°
Y' = 3.15 TL = 48.08 mm

| i | $r_j$ | $d_j$ | j | $n_j$ | $v_j$ |
|---|---|---|---|---|---|
| 1 | 15.184 | 0.80 | 1 | 1.69680 | 55.46 |
| 2 | 6.196 | 2.55 | | | |
| 3 | 183.634 | 0.80 | 2 | 1.69680 | 55.46 |
| 4 | 8.941 | 0.99 | | | |
| 5 | 10.907 | 1.43 | 3 | 1.82027 | 29.70 |
| 6 | 39.389 | Variable | | | |
| 7 | ∞ | 0.50 | | | |
| 8 | 10.271 | 1.58 | 4 | 1.58313 | 59.46 |
| 9 | −41.589 | 0.10 | | | |
| 10 | 5.695 | 1.11 | 1 | 1.78590 | 43.93 |
| 11 | 7.037 | 1.30 | | | |
| 12 | 23.198 | 0.80 | 6 | 1.84666 | 23.78 |
| 13 | 5.557 | 1.28 | | | |
| 14 | −21.659 | 1.01 | 7 | 1.48749 | 70.44 |
| 15 | −11.793 | 0.10 | | | |
| 16 | −12.022 | 1.49 | 8 | 1.48749 | 70.44 |
| 17 | −32.408 | Variable | | | |
| 18 | 28.159 | 1.19 | 9 | 1.48749 | 70.44 |
| 19 | −33.003 | Variable | | | |
| 20 | ∞ | 2.00 | 10 | 1.51680 | 64.20 |
| 21 | ∞ | 1.10 | 11 | 1.54072 | 47.20 |
| 22 | ∞ | | | | | aspherical 5th surface

K = 1.04284,  A = 1.07502 E-4
B = −8.06248 E-6  C = 4.81929 E-7
D = −1.05942 E-8 aspherical 8th surface

K = −0.57772  A = −1.17349 E-5
B = −3.33487 E-5  C = 4.24926 E-6
D = −1.88087 E-7 variable amounts

| f | 5.20 | 8.80 | 15.20 |
|---|---|---|---|
| $d_6$ | 15.98 | 6.30 | 1.60 |
| $d_{17}$ | 0.40 | 3.63 | 14.73 |
| $d_{19}$ | 1.00 | 1.30 | 1.03 | conditions amounts $|f_1|/|f_w| = 2.40$, $f_3/f_w = 6.04$,
$f_2/f_3 = 0.407$, $bf_w/f_w = 1.860$, $|m(2T)| = 1.711$ Although the present invention has been described in relation to particular preferred embodiments and examples thereof, many variations and modifications in other uses will become apparent to those skilled in the art. It is preferred, therefore, that the present invention be limited not by the specific disclosure herein, but only by the appended claims.

What is claimed:

1. A zoom lens system comprising in order from an object side of the lens system:
   a first lens group having a negative refracting power;
   a second lens group spaced from the first lens group and having a positive refracting power; and
   a third lens group spaced from the second lens group and having a positive refracting power;
   wherein at least one of a fifth and an eighth lens surface has an aspherical surface, the fifth and eighth lens surfaces being counted from the object side and the third lens group includes only a single lens.

2. The zoom lens system according to claim 1, wherein the aspherical surface of the at least one of the fifth and the eighth lens surface has a convex surface.

3. The zoom lens system according to claim 1, wherein the aspherical surface of the at least one of the fifth and the eighth lens surface is located close to an aperture area so as to improve correction of distortion.

4. The zoom lens system according to claim 1, wherein both of the fifth and eighth lens surfaces have an aspherical surface.

5. The zoom lens system according to claim 1, wherein the first, second and third lens groups are arranged and constructed such that the zoom lens system has a magnification ratio of at least about 2.9.

6. The zoom lens system according to claim 1, wherein the first lens group in the zoom lens system includes two negative lens disposed toward the object side.

7. The zoom lens system according to claim 1, wherein the second lens group includes, in order from the object side, a first positive meniscus lens, a second positive meniscus lens, a negative meniscus lens, a positive lens, and a third positive meniscus lens.

8. The zoom lens system according to claim 1, wherein the fifth lens surface is located in the first lens group and the eighth lens surface is located in the second lens group.

9. The zoom lens system according to claim 1, wherein the fifth lens surface is a positive lens in the first lens group.

10. The zoom lens system according to claim 1, wherein the eighth lens surface is a first positive meniscus lens in the second lens group.

11. The zoom lens system according to claim 1, wherein the first, second and third lens groups are arranged to satisfy an inequality:

$$2.3 < |f_1|/f_w < 2.6 \qquad f_1 < 0$$

wherein $f_1$ is a focal length of a first lens group in a zoom lens system and $f_w$ is a focal length of the zoom lens system at a wide position.

12. The zoom lens system according to claim 1, wherein the first, second and third lens groups are arranged to satisfy an inequality:

$$f_3/f_w < 6.8 \qquad f_3 > 0$$

wherein $f_3$ is a focal length of a third lens group in the zoom lens system and $f_w$ is a focal length of the zoom lens system at the wide position.

13. The zoom lens system according to claim 1, wherein the first, second and third lens groups are arranged to satisfy an inequality:

$$0.37 < bf_w/f_w$$

wherein $bf_w$ is a back focus at a wide position which is a distance between a last lens surface of the third lens group and an image surface and $f_w$ is the focal length of the zoom lens system at the wide position.

14. A zoom lens system comprising in order from an object side of the lens system:

a first lens group having a negative refracting power;

a second lens group spaced from the first lens group and having a positive refracting power; and a third lens group spaced from the second lens group and having a positive refracting power;

wherein at least one of a fifth and an eighth lens surface has an aspherical surface, the fifth and eighth lens surfaces being counted from the object side and wherein the first, second and third lens groups are arranged to satisfy an inequality:

$$0.37 < f_2/f_3 < 0.44 \qquad f_2 > 0, f_3 > 0$$

wherein $f_2$ is a focal length of the second lens group in the zoom lens system and $f_3$ is the focal length of the third lens group in the zoom lens system.

15. The zoom lens system according to claim 14, wherein the first, second and third lens groups are arranged and constructed such that the zoom lens system has a magnification ratio of at least about 2.9.

16. The zoom lens system according to claim 14, wherein the first lens group in the zoom lens system includes two negative lens disposed toward the object side.

17. The zoom lens system according to claim 14, wherein the first, second and third lens groups are arranged to satisfy an inequality:

$$2.3 < |f_1|/f_w < 2.6 \qquad f_1 < 0$$

wherein $f_1$ is a focal length of the first lens group in the zoom lens system and $f_w$ is a focal length of the zoom lens system at a wide position.

18. The zoom lens system according to claim 14, wherein the first, second and third lens groups are arranged to satisfy an inequality:

$$f_3/f_w < 6.8 \qquad f_3 > 0$$

wherein $f_3$ is a focal length of the third lens group in the zoom lens system and $f_w$ is a focal length of the zoom lens system at the wide position.

19. A zoom lens system comprising in order from an object side of the lens system:

a first lens group having a negative refracting power;

a second lens group spaced from the first lens group and having a positive refracting power; and a third lens group spaced from the second lens group and having a positive refracting power;

wherein at least one of a fifth and an eighth lens surface has an aspherical surface, the fifth and eighth lens surfaces being counted from the object side and wherein the first, second and third lens groups are arranged to satisfy an inequality:

$$1.52 < |m(2T)| < 1.74 \quad m(2T) < 0$$

wherein m (2T) is a magnification of the second lens group in the zoom lens system at a tele position.

20. The zoom lens system according to claim 19, wherein the first, second and third lens groups are arranged and constructed such that the zoom lens system has a magnification ratio of at least about 2.9.

21. The zoom lens system according to claim 19, wherein the first lens group in the zoom lens system includes two negative lens disposed toward the object side.

22. The zoom lens system according to claim 19, wherein the first, second and third lens groups are arranged to satisfy an inequality:

$$2.3<|f_1|/f_w<2.6 \qquad f_1<0$$

wherein $f_1$ is a focal length of the first lens group in the zoom lens system and $f_w$ is a focal length of the zoom lens system at a wide position.

23. The zoom lens system according to claim 19, wherein the first, second and third lens groups are arranged to satisfy an inequality:

$$f_3/f_w<6.8 \qquad f_3>0$$

wherein $f_3$ is a focal length of the third lens group in the zoom lens system and $f_w$ is a focal length of the zoom lens system at the wide position.

24. A zoom lens system comprising in order from an object side of the lens system:
   a first lens group having a negative refracting power;
   a second lens group spaced from the first lens group and having a positive refracting power; and
   a third lens group spaced from the second lens group and having a positive refracting power; wherein
   the second lens group includes five lenses and the first, second and third lens groups are arranged to emit light rays which are substantially parallel to each other and substantially perpendicular to a receiving surface upon which the light rays are impinged.

25. The zoom lens system according to claim 24, wherein the first, second and third lens groups are arranged and constructed such that the zoom lens system has a magnification ratio of at least about 2.9.

26. The zoom lens system according to claim 24, wherein the first lens group in the zoom lens system includes two negative lens disposed toward the object side.

27. The zoom lens system according to claim 24, wherein the third lens group includes only a single lens.

28. The zoom lens system according to claim 24, wherein the first, second and third lens groups are arranged to satisfy an inequality:

$$2.3<|f_1|/f_w<2.6 \qquad f_1<0$$

wherein $f_1$ is a focal length of the first lens group in the zoom lens system and $f_w$ is a focal length of the zoom lens system at a wide position.

29. The zoom lens system according to claim 24, wherein the first, second and third lens groups are arranged to satisfy an inequality:

$$f_3/f_w<6.8 \qquad f_3>0$$

wherein $f_3$ is a focal length of the third lens group in the zoom lens system and $f_w$ is a focal length of the zoom lens system at the wide position.

30. The zoom lens system according to claim 24, wherein the first, second and third lens groups are arranged to satisfy an inequality:

$$0.37<f_2/f_3<0.44 \qquad f_2>0, f_3>0$$

wherein $f_2$ is a focal length of the second lens group in the zoom lens system and $f_3$ is the focal length of the third lens group in the zoom lens system.

31. The zoom lens system according to claim 24, wherein the first, second and third lens groups are arranged to satisfy an inequality:

$$1.52<|m(2T)|<1.74 \; m(2T)<0$$

wherein $m(2T)$ is a magnification of the second lens group in the zoom lens system at a tele position.

32. The zoom lens system according to claim 24, wherein a fifth one of the five lenses of the second lens group is located at an end of the second lens group located farthest from the object side.

33. The zoom lens system according to claim 24, wherein the first, second and third lens groups are arranged and constructed such that the zoom lens system has a back focus of at least about 9.2.

34. A zoom lens system comprising, in order from an object side of the zoom lens system:
   a first lens group having a negative refracting power;
   a second lens group spaced from the first lens group and having a positive refracting power; and
   a third lens group spaced from the second lens group and having a positive refracting power; wherein
   each of the first, second and third lens groups are movable from a first position when the zoom lens system is in a wide position to a second position when the zoom lens system is in a tele position and the third lens group is arranged and constructed such that the third lens group moves from the first position in a direction toward the object side first to a mean position and then to the second position when the zoom lens system is moved from the wide position to the tele position and the third lens group moves from the second position in a direction toward an image surface first to the mean position and then to the first position when the zoom lens system is moved from the tele position to the wide position, wherein a location of the third lens group at the mean position is located closer to the object side than a location of the third lens group at the tele position and at the wide position.

35. The zoom lens system according to claim 34, wherein a location of the third lens group at the tele position and a location of the third lens group at the wide position are located at a common position.

36. The zoom lens system according to claim 34, wherein a location of the third lens group at the tele position is between a location of the third lens group at the wide position and at the mean position.

37. A zoom lens system for use in a camera having a color filter and a CCD, the zoom lens system comprising in order from an object side of the lens system:
   a first lens group having a negative refracting power;
   a second lens group spaced from the first lens group and having a positive refracting power; and
   a third lens group spaced from the second lens group and having a positive refracting power; wherein
   each of a fifth and an eighth lens surface has an aspherical surface, the fifth and eighth lens surfaces being counted from the object side, the second lens group includes five lenses, each of the first, second and third lens groups is movable from a first position when the lens system is in a wide position to a second position when the lens system is in a tele position.

38. The zoom lens system according to claim 37, wherein the first, second and third lens groups are arranged and constructed such that the zoom lens system has a magnification ratio of at least about 2.9.

39. The zoom lens system according to claim 37, wherein the first, second and third lens groups are arranged and constructed such that the zoom lens system has a back focus of at least about 9.2.

40. A camera comprising:
- a color filter;
- a CCD; and
- a zoom lens system including in order from an object side of the lens system:
  - a first lens group having a negative refracting power;
  - a second lens group spaced from the first lens group and having a positive refracting power; and
  - a third lens group spaced from the second lens group and having a positive refracting power; wherein
  - the second lens group includes five lenses and the first, second and third lens groups are arranged to emit light rays which are substantially parallel to each other and substantially perpendicular to a receiving surface upon which the light rays are impinged.

41. The camera according to claim 40, wherein the first, second and third lens groups are arranged and constructed such that the zoom lens system has a magnification ratio of at least about 2.9.

42. The camera according to claim 40, wherein the first lens group in the zoom lens system includes two negative lens disposed toward the object side.

43. The camera according to claim 40, wherein the third lens group includes only a single lens.

44. The camera according to claim 40, wherein the first, second and third lens groups are arranged to satisfy an inequality:

$$2.3 < |f_1|/f_w < 2.6 \qquad f_1 < 0$$

wherein $f_1$ is a focal length of the first lens group in the zoom lens system and $f_w$ is a focal length of the zoom lens system at a wide position.

45. The camera according to claim 40, wherein the first, second and third lens groups are arranged to satisfy an inequality:

$$f_3/f_w < 6.8 \qquad f_3 > 0$$

wherein $f_3$ is a focal length of the third lens group in the zoom lens system and $f_w$ is a focal length of the zoom lens system at the wide position.

46. The camera according to claim 40, wherein the first, second and third lens groups are arranged to satisfy an inequality:

$$0.37 < f_2/f_3 < 0.44 \qquad f_2 > 0, f_3 > 0$$

wherein $f_2$ is a focal length of the second lens group in the zoom lens system and $f_3$ is the focal length of the third lens group in the zoom lens system.

47. The camera according to claim 40, wherein the first, second and third lens groups are arranged to satisfy an inequality:

$$1.52 < |m(2T)| < 1.74 \quad m(2T) < 0$$

wherein $m(2T)$ is a magnification of the second lens group in the zoom lens system at a tele position.

48. A camera comprising:
- a color filter;
- a CCD; and
- a zoom lens system including, in order from an object side of the lens system:
  - a first lens group having a negative refracting power;
  - a second lens group spaced from the first lens group and having a positive refracting power; and
  - a third lens group spaced from the second lens group and having a positive refracting power; wherein
  - each of the first, second and third lens groups are movable from a first position when the zoom lens system is in a wide position to a second position when the zoom lens system is in a tele position and the third lens group is arranged and constructed such that the third lens group moves from the first position in a direction toward the object side first to a mean position and then to the second position when the zoom lens system is moved form the wide position to the tele position and the third lens group moves from the second position in a direction toward an image surface first to the mean position and then to the first position when the zoom lens system is moved from the tele position to the wide position, wherein a location of the third lens group at the mean position is located closer to the object side than a location of the third lens group at the first position and at the second position.

49. The camera according to claim 48, wherein a location of the third lens group at the tele position and a location of the third lens group at the wide position are located at a common position.

50. The camera according to claim 48, wherein a location of the third lens group at the tele position is between a location of the third lens group at the wide position and at the mean position.

* * * * *